US012565598B2

(12) United States Patent
Coogan et al.

(10) Patent No.: US 12,565,598 B2
(45) Date of Patent: Mar. 3, 2026

(54) COMPOSITION FOR COATING AN OVERHEAD CONDUCTOR

(71) Applicant: CABLE COATINGS LIMITED, Leeds (GB)

(72) Inventors: Niall Coogan, Armely (GB); Rachel Parker, Leeds (GB)

(73) Assignee: CABLE COATINGS LIMITED, Leeds (GB)

( * ) Notice: Subject to any disclaimer, the term of this patent is extended or adjusted under 35 U.S.C. 154(b) by 652 days.

(21) Appl. No.: 17/790,609

(22) PCT Filed: Jan. 28, 2021

(86) PCT No.: PCT/GB2021/050195
§ 371 (c)(1),
(2) Date: Jul. 1, 2022

(87) PCT Pub. No.: WO2021/152311
PCT Pub. Date: Aug. 5, 2021

(65) Prior Publication Data
US 2022/0395809 A1 Dec. 15, 2022

(30) Foreign Application Priority Data
Jan. 28, 2020 (GB) ...................................... 2001197
Jan. 30, 2020 (LU) ........................................ 101618

(51) Int. Cl.
*B01J 21/06* (2006.01)
*B01J 21/16* (2006.01)
(Continued)

(52) U.S. Cl.
CPC .......... *C09D 183/04* (2013.01); *B01J 21/063* (2013.01); *B01J 21/16* (2013.01); *B01J 27/053* (2013.01);
(Continued)

(58) Field of Classification Search
CPC ........ B01J 21/063; B01J 21/16; B01J 27/053; B01J 31/069; B01J 31/124; B01J 31/38;
(Continued)

(56) References Cited

U.S. PATENT DOCUMENTS

2005/0266981 A1 12/2005 Nakajima et al.
2009/0192252 A1 7/2009 Stration et al.
(Continued)

FOREIGN PATENT DOCUMENTS

CN 104804637 A 7/2015
CN 106251993 A 12/2016
(Continued)

OTHER PUBLICATIONS

CN107446424A Espacenet Translation (Year: 2017).*
(Continued)

*Primary Examiner* — Marc S Zimmer
*Assistant Examiner* — Virginia L Stonehocker
(74) *Attorney, Agent, or Firm* — CANTOR COLBURN LLP

(57) ABSTRACT

A composition for coating an overhead conductor is disclosed comprising: (i) a reflective agent; (ii) a photocatalytic agent comprising ≥70 wt % anatase titanium dioxide ($TiO_2$) having an average particle size ("aps")≤100 nm; (iii) a polyorganosiloxane binder; and (iv) a superhydrophobic agent comprising either: surface functionalised silica nanoparticles, a functional polysiloxane or a polymethylsilsesquioxane.

17 Claims, 5 Drawing Sheets

(51) Int. Cl.

| | |
|---|---|
| ***B01J 27/053*** | (2006.01) |
| ***B01J 31/06*** | (2006.01) |
| ***B01J 31/12*** | (2006.01) |
| ***B01J 31/38*** | (2006.01) |
| ***B01J 35/39*** | (2024.01) |
| ***B01J 35/45*** | (2024.01) |
| ***B01J 37/02*** | (2006.01) |
| ***B05D 5/08*** | (2006.01) |
| ***B05D 5/12*** | (2006.01) |
| ***B05D 7/20*** | (2006.01) |
| ***C08K 3/22*** | (2006.01) |
| ***C08K 3/36*** | (2006.01) |
| ***C08L 83/00*** | (2006.01) |
| ***C09D 5/16*** | (2006.01) |
| ***C09D 7/48*** | (2018.01) |
| ***C09D 183/04*** | (2006.01) |
| ***H01B 7/28*** | (2006.01) |
| ***H01B 9/00*** | (2006.01) |
| ***H01B 13/22*** | (2006.01) |

(52) U.S. Cl.

CPC ........... *B01J 31/069* (2013.01); *B01J 31/124* (2013.01); *B01J 31/38* (2013.01); *B01J 35/39* (2024.01); *B01J 35/45* (2024.01); *B01J 37/0219* (2013.01); *B05D 5/08* (2013.01); *B05D 5/12* (2013.01); *B05D 7/20* (2013.01); *C08L 83/00* (2013.01); *C09D 5/1618* (2013.01); *C09D 5/1637* (2013.01); *H01B 7/28* (2013.01); *H01B 9/008* (2013.01); *H01B 13/22* (2013.01); *B05D 2601/24* (2013.01); *C08K 2003/2241* (2013.01); *C08K 3/36* (2013.01); *C09D 7/48* (2018.01)

(58) Field of Classification Search

CPC ........ B01J 35/39; B01J 35/45; B01J 37/0219; H01B 9/008; H01B 13/22; H01B 7/28; C09D 183/04; C09D 5/1618; C09D 5/1637; C09D 7/48; B05D 1/02; B05D 3/02; B05D 2202/10; B05D 2256/00; B05D 2518/12; B05D 2601/24; C08K 9/00; C08K 2003/2241; Y02A 30/14

See application file for complete search history.

(56) References Cited

U.S. PATENT DOCUMENTS

| | | | | |
|---|---|---|---|---|
| 2011/0061568 | A1 | 3/2011 | Fiedler et al. | |
| 2012/0045954 | A1* | 2/2012 | Bleecher | C23C 4/126 524/502 |
| 2015/0194237 | A1 | 7/2015 | Ranganathan et al. | |
| 2016/0032107 | A1 | 2/2016 | Siripurapu et al. | |
| 2018/0112078 | A1* | 4/2018 | Ranganathan | C09D 7/62 |
| 2019/0338150 | A1 | 11/2019 | Kutchko et al. | |

FOREIGN PATENT DOCUMENTS

| | | | |
|---|---|---|---|
| CN | 106811117 | A | 6/2017 |
| CN | 107446424 | A | 12/2017 |
| CN | 107828142 | A | 3/2018 |
| CN | 109096451 | A | 12/2018 |
| EP | 1736516 | A1 | 12/2006 |
| EP | 2551929 | A1 | 1/2013 |
| FR | 2971617 | A1 | 8/2012 |
| WO | 2007034248 | A1 | 3/2007 |
| WO | 2014025420 | A1 | 2/2014 |
| WO | 2015105972 | A1 | 7/2015 |
| WO | 2017146652 | A1 | 8/2017 |
| WO | 2017192864 | A1 | 11/2017 |

OTHER PUBLICATIONS

International Search Report for the corresponding Interntional Application No. PCT/GB2021/050195; International Filing Date: Jan. 28, 2021; Date of Mailing: May 6, 2021; 4 pages.

Search Report for the corresponding International Application No. GB2001197.9; Date of Search: Jul. 28, 2020; 5 pages.

Search Report for the corresponding International Application No. LU101618; Date of Completiong of the Search: Sep. 18, 2020; 144 pages.

Written Opinion for the corresponding Interntional Application No. PCT/GB2021/050195; International Filing Date: Jan. 28, 2021; Date of Mailing: May 6, 2021; 7 pages.

* cited by examiner

Prior art

COMPOSITION FOR COATING AN OVERHEAD CONDUCTOR

CROSS-REFERENCE TO RELATED APPLICATIONS

This application is a National Stage application of PCT/GB2021/050195, filed Jan. 28, 2021, which claims benefit of Application No. GB2001197.9 filed on Jan. 28, 2020 and claims benefit of Application No. LU 101618 filed on Jan. 30, 2020, all of which are incorporated by reference herein in their entirety.

FIELD OF THE PRESENT INVENTION

The present invention relates to electric overhead conductors. Various preferred embodiments relate to high voltage electric overhead conductors which have a coating for the purpose of reducing the temperature of the conductor thereby reducing the resistance of the conductor (as electrical resistance is temperature dependent) and hence reducing power losses in the conductor (since power loss is dependent upon electrical resistance). The coated high voltage electric overhead conductor includes a photocatalytic self-cleaning agent provided in a polyorganosiloxane binder. The coating is preferably superhydrophobic and prevents or hinders dew or moisture formation upon the coated conductor. In particular, in a desert environment, salt laden moisture or dew can form upon a conductor overnight or first thing in the morning and the salt laden moisture or dew can be highly corrosive.

BACKGROUND

Various different types of high voltage electric overhead conductors are known comprising aluminium cables suspended between pylons. The various different types of known high voltage electric overhead conductors can be divided into two groups. The first group comprises conductors which have a maximum operating temperature of 80° C. The second group comprises conductors which have a higher maximum operating temperature in the range 150-250° C.

There are various particular problems associated with high voltage electric overhead conductors and these problems can become particularly acute with high voltage electric overhead conductors which are operable at elevated operating temperatures in the range 150-250° C. Such conductors may, for example, be installed in particularly hot regions of the world such as Southern USA, the Middle East and Australia.

High voltage electric overhead conductors which are installed in particularly hot regions of the world suffer from the problem that the overhead conductors are exposed to significant solar heating due to intense sunlight for a majority of the year. An overhead electric conductor which is subjected to sustained solar radiation throughout the year presents a number of significant operational challenges to a utility company seeking to manage an overhead power transmission or distribution line or network.

As will be understood by those skilled in the art, the temperature of a high voltage electric overhead conductor will tend to increase due to two main factors. The first factor is that there will be Ohmic losses due to the transmission of electric current through the conductor which will result in Joule heating of the conductor. The second factor is that the conductor will be subjected to relatively intense solar radiation (i.e. sunlight) and hence will be heated by solar radiation. It will be apparent that both factors will play a role in elevating the temperature of the conductor.

It will also be understood that there are also a number of other potential factors which will tend to decrease the temperature of the conductor. For example, a conductor may lose energy by emitting infra-red (heat) radiation. A conductor may also lose energy by conduction or by convection (e.g. due to air currents, wind etc.). However, as a practical matter, energy losses, due to conduction are fairly minimal and energy losses due to convection depend upon the geographic location where the conductor is installed.

It will be understood by those skilled in the art that the predominant cooling mechanism by which an overhead electric conductor will lose energy is via radiation i.e. by radiating heat energy and in particular infra-red radiation in the infrared wavelength range 2.5-30.0 μm.

Accordingly, to a first approximation the temperature of a high voltage overhead electric conductor will increase due to the combined effects of Joule heating and solar radiation with this-temperature increase being offset by energy loss due to the conductor emitting infra-red radiation.

For illustrative purposes, a bare overhead aluminium electric conductor may be considered having an average solar absorptivity coefficient A of 0.5 across the solar spectrum 0.3-2.5 μm. It will be understood that the bare aluminium conductor will have a corresponding average solar reflectivity coefficient R of 0.5. Accordingly, a bare aluminium electric conductor exposed to solar radiation (i.e. sunshine) will absorb approx. 50% of the incident solar radiation.

The net effect of the conductor absorbing approx. 50% of incident solar radiation over a sustained period of time coupled with significant Joule heating of the conductor will cause the temperature of the overhead conductor to rise up to a maximum rated operating temperature. Dependent upon the geographic location of the conductor energy losses due to air currents (i.e. wind) may be low or negligible. The maximum operating temperature of the conductor may be either 80° C. or in the range 150-250° C.

Once an overhead conductors reaches or approaches its maximum rated operating temperature then the utility company managing the power transmission or distribution line or network is required to reduce the transmitted current through the conductor so as to reduce the effects of Joule heating thereby maintaining the overhead conductor within a safe operating temperature range.

Various different types of conductors are known and will now be described in more detail below.

All Aluminium Conductors ("AAC") comprise hard drawn aluminium wires stranded in successive layers in opposite directions to form the conductor as per BS EN 50182 or IEC 61089. AAC conductors may be used for aerial distribution lines having relatively short spans, aerial feeders and bus bars of substations. AAC conductors have a high corrosion resistance since steel is not present. Conventional AAC conductors are typically rated up to a maximum operating temperature of 80° C.

All Aluminium Alloy Conductors ("AAAC") comprise All Aluminium Alloy ("ALMELEC") wires stranded in-successive layers in opposite directions to form the conductor as per IEC 61089, BS EN 50182 or ASTM B 399. AAAC conductors are mainly used for overhead lines in transmission and distribution electrical networks having relatively long spans. They are also used as a messenger to support overhead electrical cables. AAAC conductors have a high corrosion resistance since steel is not present. Conventional AAAC conductors are typically rated up to a maximum operating temperature of 80° C.

Aluminium Conductor Steel Reinforced ("ACSR") conductors comprise an outer layer of aluminium conductor concentrically stranded over a central core of galvanized or stranded steel wires to form the conductor as per BS EN 50182, ASTM B 232 or IEC 61089. ACSR conductors are widely used for electrical power transmission over long distances. ACSR conductors may also be used as a messenger for supporting overhead electrical cables. Conventional ACSR conductors are typically rated up to a maximum operating temperature of 80° C.

Aluminium Conductor Aluminium Clad Steel Reinforced ("ACSR/AW") conductors comprise an outer layer of aluminium conductor concentrically stranded over a central core of aluminium clad steel solid or stranded cable to form the conductor as per ASTM B 549. ACSR/AW conductors are used for electrical power transmission and are ideal for long overhead lines spans like ACSR conductors but with slightly better resistance and current carrying capacity in addition to good corrosion resistance. Conventional ACSR/AW conductors are typically rated up to a maximum operating temperature of 80° C.

Areal Bundled Cables ("ABC") are made from aluminium conductors which are insulated by XLPE insulation and assembled to form two (Duplex), three (Triplex), four (Quadruplex) or more conductors as per ICEA S 474-76 or BS EN 50182. They are used for secondary overhead lines (in circuits not exceeding 600 V phase to phase) on poles or as feeders to residential premises.

Various High Temperature Low Sag ("HTLS") conductors are also known which are designed to operate at significantly higher operational temperatures of up to 150-250° C.

Known HTLS conductors include Aluminium Conductor Composite Core ("ACCC") conductors, Alupiinium Conductor Steel Supported ("ACSS/MA") conductors, Aluminium Conductor Aluminium Clad Steel Supported ("ACSS/AW") conductors, Thermal Resistant Aluminium Alloy Conductor Steel Reinforced ("TACSR") conductors, Thermal Resistant Aluminium Alloy Conductor Aluminium Clad Steel Reinforced ("TACSR/AW") conductors and Super Thermal Resistant Aluminium Alloy Conductor Aluminium Clad Invar Reinforced ("STACIR/AW") conductors.

Aluminium Conductor Composite Core ("ACCC") conductors comprise a concentrically stranded conductor with one or more layers of trapezoidal shaped annealed 1350-O aluminium wires on a central core of light weight carbon-glass fibre composite. ACCC conductors comprising a hybrid carbon composite core are stronger and lighter than traditional steel cores. ACCC conductors are capable of carrying twice the current of traditional ACSR conductors as ACCC conductors are designed for continuous operating temperatures of up to 180° C. in addition to its lighter core which allows approx. 30% more aluminium to be used without increasing the total weight. Usage of ACCC conductors reduces line losses by 30-40% under equal load conditions compared with traditional ACSR conductors of the same diameter and weight. ACCC conductors have greater strength, effective-self-damping, superior fatigue resistance and a low coefficient of expansion thereby reducing conductor sag under heavy electrical load conditions. As a result, ACCC conductors can be used to increase spans between fewer or shorter structures. ACCC conductors have greater corrosion resistance than traditional ACSR conductors.

ACCC conductors are used for overhead distribution and transmission lines and are particularly useful in reconductoring applications requiring increased current with existing tensions and clearances, new line applications where structures can be economised due to reduced conductor sag, new line applications requiring high emergency loading and lines where vibration due to wind is a problem. ACCC conductors can also be used at corrosive and coastal environments due to their good corrosion resistance. Conventional ACCC conductors are typically rated up to a maximum operating temperature of 180° C.

Aluminium Conductor Steel Supported ("ACSS/MA") conductors comprise one or more layers of annealed aluminium 1350-O wires stranded over a central core of zinc-5% aluminium mischmetal alloy coated steel wires that are designed to withstand most or all of the mechanical load on the ACSS conductor. ACSS conductors may be manufactured according to ASTM B 856.

ACSS/MA conductors are similar to traditional ACSR conductors except that ACSS/MA conductors can be operated continuously at high temperatures up to 250° C. without damage. ACSS/MA conductors sag less under emergency loading than ACSR conductors, have self-damping properties and final sag is not affected by long time creep of the aluminium.

ACSS/MA conductors are used for overhead distribution and transmission lines and are particularly useful in reconductoring applications requiring increased current with existing tensions and clearances. ACSS/MA conductors are also used for new line applications where structures can be economised due to reduced conductor sag, new line applications requiring high emergency loadings and lines where vibration due to wind is a problem. Conventional ACSS/MA conductors are typically rated up to a maximum operating temperature of 250° C.

Aluminium Conductor Aluminium Clad Steel Supported ("ACSS/AW") conductors comprise one or more layers of annealed aluminium 1350-O wires stranded over a central core of aluminium clad steel wires that are designed to withstand most or all of the mechanical load on ACSS/AW conductors. ACSS/AW conductors may be manufactured according to ASTM B 856.

ACSS/AW conductors can operate continuously at high temperatures up to 200° C. without damage. The aluminium clad steel core which consists of a thick layer of aluminium (approx. 10% of the nominal wire radius) over steel gives ACSS/AW conductors the advantages of ACSS conductors along with light weight and good conductivity of aluminium with the high tensile strength and ruggedness of steel.

ACSS/AW conductors are used for overhead distribution and transmission lines and are especially useful in reconductoring applications requiring increased current with existing tensions and clearances. ACSS/AW conductors are also used for new line applications where structures can be economised due to reduced conductor sag, new line applications requiring high emergency loadings and lines where vibration due to wind is a problem.

ACSS/AW conductors have strength characteristics similar to ACSS conductors along with slightly greater ampacity and resistance to corrosion due to aluminium cladding of the steel core wires. Conventional ACSS/AW conductors are typically rated up to a maximum operating temperature of 200° C.

Thermal Resistant Aluminium Alloy Conductor Steel Reinforced ("TACSR") conductors comprise one or more layers of thermal resistant aluminium zirconium alloy (AT1)

wires stranded over a central core of zinc coated steel wire(s) as per IEC 62004 and IEC 60888 and generally according to IEC 61089.

TACSR conductors are able to carry higher (150%) load current than traditional ACSR conductors as they are designed for continuous operating temperatures of up to 150° C. TACSR conductors have the same installation technique as ACSR conductors.

TACSR conductors are used for overhead distribution and transmission lines and are particularly useful in new line applications requiring increased current. Conventional TACSR conductors are typically rated up to a maximum operating temperature of 150° C.

Thermal Resistant Aluminium Alloy Conductor Aluminium Clad Steel Reinforced ("TACSR/AW") conductors comprise one or more layers of thermal resistant aluminium zirconium alloy (AT1) wires stranded over a central core of stranded aluminium clad steel (20SA Type A) wire(s) as per IEC 62004 and IEC 61232 and generally according to IEC 61089.

TACSR/AW conductors are able to carry higher load current than traditional ACSR conductors as they are designed for continuous operating temperatures of up to 150° C. TACSR/AW conductors have increased corrosion resistance and lower electrical resistance and lower mass than TACSR conductors. TACSR/AW conductors have the same installation technique as ACSR conductors.

TACSR/AW conductors are used for overhead distribution and transmission lines and are particularly useful in new line applications requiring increased current. TACSR/AW may be used at corrosive and coastal environments due to their good corrosion resistance. Conventional TACSR/AW conductors are typically rated up to a maximum operating temperature of 150° C.

Super Thermal Resistant Aluminium Alloy Conductor Aluminium Clad Invar Reinforced ("STACIR/AW") conductors comprise one or more layers of super thermal resistant aluminium zirconium alloy (AT3) wires stranded over a central core of stranded aluminium clad invar wires as per IEC 62004 and generally according to IEC 61089 and IEC 61232. Invar is a special Fe/Ni alloy having a very low coefficient of linear expansion.

STACIR/AW conductors are able to carry higher (200%) load current than traditional ACSR conductors as they are designed for continuous operating temperatures of up to 210° C. Beyond knee point STACIR/AW conductors experience a sag increase due to the expansion of the Invar core alone (extremely low value ≤$3.7\times10^{-6}$/° C.) which controls sag at high operating temperatures. STACIR/AW conductors have increased corrosion resistance and have the same installation technique as ACSR conductors.

STACIR/AW conductors are used for overhead distribution and transmission lines and are particularly useful in new line applications requiring increased current. STACIR/AW conductors may be used at corrosive and coastal environments due to their good corrosion resistance. Conventional STACIR/AW conductors are typically rated up to a maximum operating temperature of 210° C.

Accordingly, known HTLS conductors enable high voltage overhead electric conductors to be operated at significantly higher temperatures up to a maximum operating temperature in the range 150-250° C.

It will be appreciated that there can potentially be significant power losses due to Ohmic loses if an electric conductor is operated at a maximum operating temperature in the range 150-250° C. If the temperature of a conductor begins to approach the maximum operating temperature of e.g. 150-250° C. then the power operator is required to reduce the current being transmitted through the conductor in order to reduce Joule heating effects and thus ensure that the maximum safe operating temperature of the conductor is not exceeded. It will be appreciated that it is problematic for a utility company to have to reduce the current being transmitted through the conductor especially as the reduction in transmitted power may coincide with increased consumer or business demand for electricity.

It will be appreciated that a high voltage overhead electric power line installed in a hot region of the world such as the Middle East may operate at high ambient temperatures e.g. >40° C. Furthermore, the conductor may operate at a high maximum operating temperature in the range 150-250° C. It will be apparent that such conductors will suffer from the problem of having high energy losses due to the high resistance of the conductor at such elevated temperatures. Furthermore, the ampacity (i.e. maximum current carrying capacity) of the conductor will be reduced.

The amount of heat generated in an overhead electric conductor due to Ohmic losses (or Joule heating) will follow the following relationship:

$$\text{Ohmic losses}=I^2R \qquad (1)$$

wherein I is the current passing through the overhead electric conductor and R is the electrical resistance of the conductor.

It will also be understood that the electrical resistance R of an electric conductor is temperature dependent. The electric resistance R of a conductor as a function of temperature may be determined by the following relationship:

$$R_\theta=R_{20}[1+\alpha(\theta-20)]\,\Omega/\text{km} \qquad (2)$$

wherein $R_\theta$ is the electrical DC resistance of the conductor at θ° C., $R_{20}$ is the electrical DC resistance of the conductor at 20° C. and a is the temperature coefficient of resistance of the conductor. For aluminium, α=0.00403.

For completeness, cable ampacity or current carrying capacity is defined as the continuous maximum current that a conductor can carry at its maximum operating temperature.

Accordingly, a combination of Joule heating, high ambient temperatures, high solar heating and an absence of cooling due to air currents (e.g. wind) will result in the temperature of the conductor quickly rising. It will be understood that as the temperature of the conductor rises then in view of the positive correlation between temperature and resistance then the electrical resistance of the conductor will increase which will result in further electrical losses in the conductor (and hence further Joule heating). As a result, the temperature of the overhead electrical conductor will tend to increase yet further which only exacerbates the problem.

It is apparent, therefore, that operating an overhead electrical conductor in a particularly high temperature region of the world presents significant operational problems.

It is known to attempt to reduce the temperature of an overhead electric conductor by applying a coating to the conductor in order to reduce the temperature of the overhead conductor.

A first known approach involves utilising a black coating such as carbon black which has a high solar absorptivity of A=0.96 (R=0.04) but also a high emissivity of E=0.96. The first known approach focuses upon enabling a conductor to lose thermal energy which it has gained.

WO 2015/105972 (Ranganathan) is an example of a variant of the first known approach and discloses an arrangement comprising a conductor having a single polymeric layer of a carbon black based polymer. An infra-red ("IR") reflective agent may be included in the carbon black layer. The emissivity F of the conductor is stated as being ≥0.85 and the overall absorptivity A is stated as being ≤0.3 (R≥0.7).

WO 2014/025420 (Davis) discloses coating a bare conductor with a non-white (i.e. grey, black etc.) inorganic coating. It is stated that the non-white coating may have an emissivity E>0.8 and a solar absorptivity coefficient A>0.3 (R<0.7). Colour may be defined with reference to CIE Publication 15.2(1986), section 4.2 and the disclosed CIE colour space which is organised as a cube with L*, a* and b* axes. The minimum for L* is 0 which represents perfect blackness. WO 2014/025420 (Davis) defines white as having a L*≥80. Accordingly, the non-white coating disclosed in WO 2014/025420 (Davis) is stated as having a L*<80 (i.e. is non-white).

A second different known approach is to coat the electric conductor with a white coating which has a low solar absorbance and hence a high solar reflectance.

For example, WO 2007/034248 (Simic) is an example of the second known approach and discloses coating a bare conductor with various white coatings which may in some cases have an emissivity E≥0.7 and a coefficient of solar absorption A≤0.3 (R≥0.7).

One disclosed coating in WO 2007/034248 (Simic) is titanium oxide ($TiO_2$) white paint with potassium silicate. The titanium oxide in the white paint provides the coating with a high emissivity of E=0.92. The absorptivity coefficient A is stated as being 0.17 and hence the reflectivity coefficient R is 0.83. The form of the titanium oxide is not stated in WO 2007/034248 (Simic) but it is assumed that the titanium oxide comprises rutile titanium dioxide ($TiO_2$) which is the most common form of titanium dioxide ($TiO_2$) and which is commonly used in white paint. Furthermore, as shown in FIG. 6 of the present application, rutile titanium dioxide ($TiO_2$) has a higher reflectance in the solar spectrum than the less common form of titanium dioxide ($TiO_2$) namely anatase titanium dioxide ($TiO_2$).

In addition to the first known approach (black coating) and the second known approach (white coating) it is known to provide specific formulations of a coating in order to solve other problems.

For example, FR-2971617 (Nexans) discloses coating an electrical conductor with a polyvinylidene difluoride ("PVDF") polymeric coating in order to improve the age resistance of the coating. The PVDF polymeric coating is stated as having an emissivity E≥0.85 and a solar absorptivity A 0.10 (R≥0.90). FR-2971617 (Nexans) states that fabricating a temperature reducing coating for an overhead electrical conductor using PVDF results in the electrical conductor having an improved resistance to ultraviolet radiation and hence having an improved resistance to aging.

The PVDF coating disclosed in FR-2971617 (Nexans) may be applied to a conductor in the form of a paint comprising an organic solvent into which PVDF as a binder is dissolved. An additive such as a white pigment (e.g. barium sulphate, magnesium oxide or aluminium oxide) may be added to the paint in order the achieve the stated emissivity and solar absorptivity values. According to a disclosed arrangement the liquid paint may comprise a liquid paint marketed by ARKEMA (RTM) referred to as KYNAR (RTM) 500 in which was added a white pigment comprising either magnesium oxide (E=0.9, A=0.09, R=0.81), aluminium oxide (E=0.9, A=0.09, R=0.81) or barium sulphate (E=0.88, A=0.06, R=0.94).

In summary, it is known to coat an overhead conductor with a black coating in order to maximise the emissivity E of the conductor or alternatively to coat an overhead conductor with a white coating having a low solar absorbance A and hence a correspondingly high solar reflectance R.

However, the present inventors have tested conventional coatings and have found that both known approaches only result in a limited improvement in performance (i.e. a small reduction in temperature) or indeed in some cases they have found that e.g. a white coating without, for example, a thermal emitter additive actually results in worse performance than a bare uncoated conductor. Furthermore, some known white coatings and have been found to have a poor corrosion resistance and to discolour rapidly making them commercially impractical.

In particular, it has been suggested that a magnesium oxide white paint might be applied to an overhead conductor in order to reduce the operating temperature of the conductor. However, the present inventors have been unable to replicate any such alleged performance benefits and indeed theoretical calculations (see Table 1 below) and empirical testing of certain white painted conductors was found by the present inventors to result in an increase in the temperature of the conductor rather than a reduction of the temperature of the conductor.

The present inventors therefore consider that coating an overhead conductor with e.g. a magnesium oxide white paint per se is disadvantageous in terms of performance and highly problematic in terms of poor corrosion resistance.

Accordingly, there remains a need for an improved overhead conductor having an improved temperature reduction performance together with having a good or excellent corrosion resistance and which remains white for an extended period of time. Furthermore, various embodiments of the present invention are concerned with High Temperature Low Sag ("HTLS") conductors having a maximum operating temperature in the range 150-250° C. At such elevated temperatures problems with known coated conductors become particularly acute.

An improved overhead conductor capable of providing significant temperature reduction effects particularly at elevated operating temperatures in the range 150-250° C. would result in a significant reduction in power losses coupled with a higher ampacity.

It will be understood by those skilled in the art that the ability to provide an improved overhead conductor capable of operating at elevated temperatures (e.g. in the range 150-250° C.), with good corrosion resistance, which remains white for an extended period of time and having an improved temperature reduction performance would be of significant commercial interest and would represent a significant advance in the art.

A particularly significant problem with white coated conductors which is often overlooked is that white coatings will accrete dirt and will discolour over a period of time as the conductor is exposed to environmental pollutants or contaminants. As a result, the initial high solar reflectance can rapidly drop as the white coating discolours resulting in a significant reduction in performance. For example, it has been reported that materials having a high initial reflectance R of >0.80 may experience a reduction of reflectance R by an average of 0.16 over three years.

Other studies have shown that the darkening effects on the solar reflectance of roof members resulted in a 11-59% reduction in solar reflectance after a period of 5-8 years of outdoor exposure.

It is therefore also desired to provide an improved overhead conductor which is less prone to discolouration by accreting dirt and environmental pollutants and hence which shows a reduced or negligible loss in performance with time by virtue of the conductor remaining white for an extended period of time.

Overhead transmission lines often operate in a desert environment which can be highly corrosive due to salts from the desert and from the sea, ocean or Gulf. Furthermore, high ultra violet ("UV") irradiation, high temperatures (which accelerate corrosion kinetics) and atmospheric pollutants such as NOx and SOx serve to make desert environments potentially highly corrosive environments.

Accordingly, in many cases, the steel cores of ACSR conductors will corrode rapidly and the conductors will also suffer from surface pitting and crevice corrosion which can reduce the usable life of the conductor.

These phenomena are particularly pronounced on lines which are temporarily or permanently lightly loaded as they in turn operate at near ambient temperature.

At night when the dew point is reached, significant moisture can collect on the lines. The moisture will then enter the core which will serve to rapidly accelerate the corrosion of the core.

The present invention is particularly concerned with preventing dew or salt laden moisture from forming either overnight or first thing in the morning upon an overhead conductor particularly in a desert environment. Dew or salt laden moisture in e.g. the Middle East or the Gulf can be highly corrosive to an overhead conductor.

Ultimately, corrosion of the core will result in the lines needing replacing.

It is known to attempt to reduce the amount of water entering a line due to ice formation or ice adherence.

It will be appreciated that the problem of ice formation or ice adherence is not quite the same as the problem of preventing salt laden moisture formation on an overhead line particularly on an overhead line which is located in the Middle East or the Gulf.

Nonetheless, WO 2017/192864 (Ranganathan) which discloses a coating composition that reduces ice adherence and minimises ice accumulation on overhead conductors will be discussed in further detail below. In particular, WO 2017/192864 (Ranganathan) discloses providing a coating composition which comprises a polymeric binder (e.g. a water based fluoroethylene vinyl ether copolymer "FEVE") and a film forming lubricant. The film forming lubricant may comprise a water based cyclo silicone lubricant or a polymeric resin with perfluoroalkyl chains.

WO 2017/192864 (Ranganathan) discloses that the coating composition may comprise a filler for the purpose of increasing the scratch resistance of the coating. According to an example, the filler may comprise titanium dioxide having an average particle size ("aps")≤500 nm. However, comparison of Example 15 with Example 14 as disclosed in WO 2017/192864 (Ranganathan) shows that the addition of a filler is undesirable in the sense that the addition of the filler disadvantageously increases the ice adherence pressure. Accordingly, the inclusion of a filler disadvantageously increases the strength required to remove ice as compared to an identical composition (Example 14) without filler.

It is considered, therefore, that WO 2017/192864 (Ranganathan) teaches away from including titanium dioxide as a filler since the addition of titanium dioxide worsens the ability of the coating to prevent ice adherence.

Accordingly, it is desired to provide a composition for coating an overhead conductor which reduces the operating temperature of the conductor and which does not suffer from some of the problems which conventional coatings suffer from such as poor optical properties, discoloration with time and poor corrosion resistance.

Furthermore, it is desired to provide a conductor which exhibits improved resistance to salt laden moisture which may form overnight on the conductor.

SUMMARY OF THE PRESENT INVENTION

According to an aspect of the present invention there is provided a composition for coating an overhead conductor comprising:

- a reflective agent;
- a photocatalytic agent comprising ≥70 wt % anatase titanium dioxide ($TiO_2$) having an average particle size ("aps")≤100 nm;
- a polyorganosiloxane binder; and
- a superhydrophobic agent comprising either: (i) surface functionalised silica nanoparticles; (ii) a functional polysiloxane; or (iii) polymethylsilsesquioxane.

According to the present invention a composition is provided which has numerous advantageous aspects including advanced photonic aspects, self-cleaning to prevent discolouration and performance loss with time and also further advantageously being highly resistant to the formation of dew or salt laden moisture on the overhead conductor, particularly in a desert environment, wherein dew or salt laden moisture lying on the conductor overnight and/or first thing in the morning can be potentially highly corrosive to the overhead conductor.

According to the present invention a coating for an overhead conductor is provided which has a corrosion barrier by making the surface highly hydrophobic or superhydrophobic. This results in a surface which is not fully wetted by water droplets. For the present purposes a hydrophobic surface may be characterised as a surface having a water contact angle ("WCA") >90°. Similarly, a superhydrophobic surface may be defined as a surface having a water contact angle ("WCA") >150°.

According to the present invention the composition includes a superhydrophobic agent which is particularly effective at preventing salt laden moisture from forming upon the conductor overnight and/or first thing in the morning.

According to the preferred embodiment the composition preferably forms a coating on an overhead conductor which is superhydrophobic i.e. the outer surface of the coating has a water contact angle ("WCA") >150°.

Contact angle hysteresis ("CAH") and water sliding angle ("WSA") are also important properties with respect to the superhydrophobicity of a material. Sliding angle refers to the angle at which a droplet of water of a specified weight begins sliding off the substrate. Contact angle hysteresis ("CAH") refers to the difference between advancing and receding contact angles. For both water sliding angle and CAH, a surface is superhydrophobic if the recorded angle is less than 10°. By minimizing the contact area between a potentially corrosive liquid and the conductor surface, superhydrophobic surfaces can offer great resistance to corrosion.

It is known to utilise room temperature vulcanising ("RTV") silicone which is a binder which specifically cures at room temperature upon exposure to atmospheric moisture. Some of the benefits of room temperature vulcanising based coatings include the retention of hydrophobicity and strong chemical, temperature and UV resistance.

Room temperature vulcanising silicone resins are commonly used in conjunction with a crosslinking agent. Many known coatings use room temperature vulcanising silicones to formulate hydrophobic and superhydrophobic coatings for insulators with the aim of reducing excessive surface icing.

It is known, for example, to utilise room temperature vulcanising polysiloxane-based coatings for high-voltage electrical insulators.

The known coatings for high-voltage electrical insulators comprise room temperature vulcanising poly(siloxane), inorganic filler such as silica, adhesion promoters, alumina trihydrate and condensation catalysts (typically metallic).

However, it is not known to use such coatings on an overhead conductor itself and there is no suggestion of using such coatings on an overhead conductor to prevent salt laden moisture formation.

It will be understood that the composition according to the present invention is particularly effective in reducing corrosion and furthermore the coating helps to cool the overhead conductor leading to reduced power losses or increased in current carrying capacity.

According to the preferred embodiment this is achieved by making the coating simultaneously possess high solar reflectivity and high thermal emissivity.

Beneficially, the superhydrophobic coating is also self-cleaning as inspired by the lotus leaf structure. The self-cleaning functionality can be attributed to the rolling water droplets underpinned by the low water sliding angle. This is a beneficial synergy as it allows for the solar reflectance to remain highly solar reflective over time.

It will be appreciated by those skilled in the art that a composition according to the present invention represents a significant advance in the art and is of high commercial interest.

EP-2231789 (Fiedler) does not disclose providing a composition for coating an overhead conductor which includes inter alia a photocatalytic agent comprising ≥70 wt % anatase titanium dioxide ($TiO_2$) having an average particle size ("aps")≤100 nm.

Accordingly, EP-2231789 (Fiedler) is not considered relevant to the present invention.

According to the preferred embodiment the reflective agent comprises rutile titanium dioxide ($TiO_2$).

WO 2017/192864 (Ranganathan) discloses a coating composition that reduces ice adherence and minimises ice accumulation on overhead conductors. In particular, WO2017/192864 (Ranganathan) discloses providing a coating composition which comprises a polymeric binder (e.g. a water based fluoroethylene vinyl ether copolymer "FEVE") and a film forming lubricant. The film forming lubricant may comprise a water based cyclo silicone lubricant or a polymeric resin with perfluoroalkyl chains.

WO 2017/192864 (Ranganathan) discloses that the coating composition may comprise a filler for the purpose of increasing the scratch resistance of the coating. According to an example, the filler may comprise titanium dioxide having an average particle size ("aps")≤500 nm. However, comparison of Example 15 with Example 14 shows that the addition of a filler is undesirable in the sense that the addition of the filler disadvantageously increases the ice adherence pressure. Accordingly, the inclusion of a filler disadvantageously increases the strength required to remove ice as compared to an identical composition (Example 14) without filler.

WO 2017/192864 (Ranganathan) does not disclose including a reflective agent such as rutile titanium dioxide ($TiO_2$) having an average particle size ("aps") ≥100 nm.

WO 2017/192864 (Ranganathan) also does not disclose including a photocatalytic agent comprising ≥70 wt % anatase titanium dioxide ($TiO_2$) having an average particle size ("aps")≤100 nm.

WO 2017/192864 (Ranganathan) also does not disclose providing a polyorganosiloxane binder.

Finally, WO2017/192864 (Ranganathan) does not disclose providing a superhydrophobic agent comprising either: (i) surface functionalised silica nanoparticles; (ii) a functional polysiloxane; or (iii) polymethylsilsesquioxane.

Accordingly, WO 2017/192864 (Ranganathan) is not considered to be particularly relevant to the present invention.

The composition as initially applied to an overhead conductor may include a solvent. The solvent may comprise water or a non-aqueous solvent. For example, it is contemplated that a non-aqueous solvent such as xylene, xylol or dimethylbenzene ($(CH_3)_2C_6H_4$), toluene ($(CH_3)C_6H_5$), ethanol ($C_2H_5OH$), isopropanol ($CH_3CH(OH)CH_3$), 2-ethoxyethanol ($C_2H_5OC_2H_4OH$) or 2-ethoxyethyl acetate ($CH_3C(O)OC_2H_4OC_2H_5$) may be utilised.

The rutile titanium dioxide ($TiO_2$) which is preferably provided as a reflective agent preferably has an average particle size ("aps"): (i) ≥100 nm; (ii) 100-200 nm; (iii) 200-300 nm; (iv) 300-400 nm; (v) 400-500 nm; (vi) 500-600 nm; (vii) 600-700 nm; (viii) 700-800 nm; (ix) 800-900 nm; and (x) 900-1000 nm.

The average particle size is generally provided by the manufacture, but the skilled person would also know how to measure the average particle size of the titanium dioxide particles using techniques common in the art. For example, average particle size may be measured by Dynamic Light Scattering, for example using the procedure set out in ASTM E3247-20.

The rutile titanium dioxide ($TiO_2$) preferably comprises substantially spherical particles.

The reflective agent may alternatively comprise sodium aluminosilicate ($AlNa_{12}SiO_5$), zinc oxide (ZnO) or copper oxide (CuO).

The reflective agent may comprise a white filler. The white filler may comprise: (i) magnesium oxide (MgO); (ii) calcium oxide (CaO); (iii) aluminium oxide ($Al_2O_3$); (iv) zinc oxide (ZnO); (v) calcium carbonate ($CaCO_3$); (vi) aluminium silicate ($Al_2SiO_5$); (vii) kaolin ($Al_2O_3 \cdot 2SiO_2$); (viii) titanium dioxide ($TiO_2$); or (viii) barium sulphate ($BaSO_4$).

The reflective agent preferably does not comprise anatase titanium dioxide.)

The photocatalytic agent preferably comprises ≥75%, 80%, ≥85%, ≥90%, ≥95% or ≥99% wt % anatase titanium dioxide ($TiO_2$).

The polyorganosiloxane binder preferably has the structure:

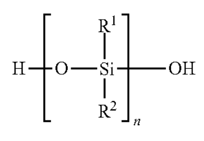

wherein $R^1$ and $R^2$ are organic functional groups and may be the same or different.

The surface functionalised silica nanoparticles are preferably functionalized by either: (i) hexamethyldisilazane ("HMDS"); (ii) tetraethyl orthosilicate ("TEOS"); or (iii) tridecafluorooctyltriethoxysilane ("FAS").

Alternatively, other silanes may be utilized.

The functional polysiloxane may be modified with one or more amine or fluoro-containing groups.

The composition when cured preferably forms a coating having a water contact angle ("WCA") ≥150°. According to other embodiments the composition when cured preferably forms a coating having a water contact angle ≥90°, ≥95°, ≥100°, ≥105°, ≥110°≥115°, ≥120°, ≥125°, ≥130°, ≥135°, ≥140°, ≥145°, ≥150°, ≥155° or ≥160°.

The composition may further comprise an organic adjunct resin.

The organic adjunct resin comprises either an acrylic resin, a styrene resin, an epoxy resin or a co-polymeric resin.

The composition may further comprise a cross linking agent which may comprise an alkoxy silane. For example, the alkoxy silane may comprise either tetraethyl orthosilicate, octadecyltrichlorosilane, methyltrimethoxysilane, vinyltriethoxysilane, ethyltrimethoxysilane, propyltrimethoxysilane, 3-(2-aminoethyl)-aminopropyltrimethoxysilane, aminopropyltriethoxysilane, phenyltrimethoxysilane or glycidoxypropyltrimethoxysilane.

The composition may further comprise a UV stabiliser. The UV stabiliser may comprise a ultraviolet light absorber.

The ultraviolet light absorber may comprise 2-(2H-benzotriazol-2-yl)-p-cresol or 2--(4,6-Bis-(2,4-dimethylphenyl)-1,3,5-triazin-2-yl)-5-(octyloxy)-phenol.

The UV stabiliser may comprise a hindered amine light stabiliser ("HALS").

The hindered amine light stabiliser may comprise bis(1-octyloxy-2,2,6,6-tetramethyl-4-piperidyl)sebacate or bis(1,2,2,6,6-pentamethyl-4-piperidyl)sebacate.

The composition may further comprise an emissive agent. The emissive agent may comprise an inorganic filler. According to various embodiments, the inorganic filler may comprise either: (i) calcium carbonate ($CaCO_3$); (ii) calcined kaolin ($Al_2O_3 \cdot 2SiO_2$); or (iii) talc (hydrated magnesium silicate ($H_2Mg_3(SiO_3)_4$ or $Mg_3Si_4O_{10}(OH)_2$)).

The composition may further comprise a curing agent.

The composition may further comprise a viscosity modifier and/or rheology agent. For example, the viscosity modifier and/or rheology agent may comprise methyl cellulose, hydroxy ethyl cellulose ("HEC"), carboxy methyl cellulose ("CMC"), hydroxy propyl cellulose ("HPC"), hydrophobically modified hydroxy ethyl cellulose, an alkali swellable emulsion ("ASE"), an hydrophobic alkali swellable emulsion ("HASE"), a hydrophobically modified ethylenoxide urethane rheology modifier ("HUER"), an organoclay, a polyamide or fumed silica.

The composition may further comprise wetting agent and/or dispersion agent. The wetting agent and/or dispersion agent may comprise a poly acrylic acid, a polyurethane, a polyacrylate, a phosphoric acid ester or a modified fatty acid.

The composition may further comprise a primer. The primer may comprise an ethyl silicate.

According to another aspect there is provided an overhead conductor at least partially coated with a composition as described above, wherein, in use, the composition is cured so as to form a coating or film on at least a portion of the overhead conductor. The coating or film preferably forms a single monolithic coating, layer or film on at least a portion of the overhead conductor.

The coating or film preferably has an average thermal emissivity coefficient E≥0.80, 0.85 or 0.90 across the infrared spectrum 2.5-30.0 μm.

The coating or film preferably has an average solar reflectivity coefficient R≥0.80, 0.85 or 0.90 across the solar spectrum 0.3-2.5 μm.

The coating or film is preferably substantially white in colour and has a L*≥80, L*≥85, L*≥90 or a L*≥95.

According to various embodiments the coating or film preferably has an average thermal emissivity coefficient E≥0.80, 0.85 or 0.90 across the infrared spectrum 2.5-30.0 μm when tested in accordance with ASTM E408 (2013) and/or an average solar reflectivity coefficient R≥0.80, 0.85 or 0.90 and/or an average solar absorptivity coefficient A≤0.20, 0.15 or 0.10 across the solar spectrum 0.3-2.5 μm when tested in accordance with ASTM E903 (2012).

The overhead conductor when tested in accordance with ANSI C119.4-2004 preferably operates at a lower temperature than the temperature of the same overhead conductor without the coating or film.

The overhead conductor is preferably arranged and adapted to transmit, in use, electrical power at a voltage ≥2 kV, 2-50 kV, 50-100 kV, 100-150 kV, 150-200 kV, 200-250 kV, 250-300 kV, 300-350 kV, 350-400 kV, 400-450 kV, 450-500 kV, 500-550 kV, 550-600 kV, 600-650 kV, 650-700 kV, 700-750 kV, 750-800 kV or ≥800 kV.

The overhead conductor is preferably arranged and adapted to operate, in use, up to a maximum operating temperature of 80° C., 90° C., 100° C., 110° C., 120° C., 130° C., 140° C., 150° C., 160° C., 170° C., 180° C., 190° C., 200° C., 210° C., 220° C., 230° C., 240° C., 250° C., 260° C., 270° C., 280° C., 290° C., 300° C. or >300° C.

The overhead conductor is preferably arranged and adapted to be suspended, in use, between overhead pylons.

The overhead conductor preferably comprises one or more metallic conductors.

The overhead conductor preferably comprises one or more metal cables.

The one or more metallic conductors and/or the one or more metal cables preferably comprise aluminium or an aluminium alloy.

The overhead conductor preferably comprises: (i) an All Aluminium Conductor ("AAC"); (ii) an All Aluminium Alloy Conductor ("AAAC"); (iii) an Aluminium Conductor Steel Reinforced ("ACSR") conductor; (iv) an Aluminium Conductor Aluminium Clad Steel Reinforced ("ACSR/AW") conductor; (v) an Areal Bundled Cable ("ABC"); (vi) a High Temperature Low Sag ("HTLS") conductor; (vii) an Aluminium Conductor Composite Core ("ACCC") conductor; (viii) an Aluminium Conductor Steel Supported ("ACSS/MA") conductor; (ix) an Aluminium Conductor Aluminium Clad Steel Supported ("ACSS/AW") conductor; (x) a Thermal Resistant Aluminium Alloy Conductor Steel Reinforced ("TACSR") conductor; (xi) a Thermal Resistant Aluminium Alloy Conductor Aluminium Clad Steel Reinforced ("TACSR/AW") conductor; or (xii) a Super Thermal Resistant Aluminium Alloy Conductor Aluminium Clad Invar Reinforced ("STACIR/AW") conductor.

The coating or film preferably has a thickness in the range 1-10 μm, 10-20 μm, 20-30 μm, 30-40 μm, 40-50 μm, 50-60 μm, 60-70 μm, 70-80 μm, 80-90 μm, 90-100 μm, 100-110 μm, 110-120 μm, 120-130 μm, 130-140 μm, 140-150 μm, 150-160 μm, 160-170 μm, 170-180 μm, 180-190 μm, 190-200 μm, 200-300 μm, 300-400 μm, 400-500 μm, 500-600 μm, 600-700 μm, 700-800 μm, 800-900 μm, 900-1000 μm or >1 mm.

According to another aspect there is provided an electric power or distribution system comprising one or more overhead conductors as described above.

According to another aspect there is provided a method of coating or applying a film to an overhead conductor comprising:

applying a composition as described above to at least a portion of an overhead conductor; and allowing the composition to cure.

The composition may be allowed to cure by moisture curing and preferably does not involve heating the composition above ambient temperature. However, for rapid processing thermal curing may be appropriate.

The method preferably further comprises allowing the composition to cure so as to form a coating or film on at least a portion of the overhead conductor without utilising a thermal curing step.

The step of allowing the composition to cure so as to form a coating or film on at least a portion of the overhead conductor preferably comprises maintaining the temperature of the composition and/the coating or film being formed on the overhead conductor below 100° C., 90° C. or 80° C.

According to another aspect there is provided a kit for forming a composition for coating an overhead conductor comprising:

a first part comprising: (i) a reflective agent; (ii) a photocatalytic agent comprising ≥70 wt % anatase titanium dioxide ($TiO_2$) having an average particle size ("aps") ≤100 nm; (iii) a polyorganosiloxane binder; and (iv) a superhydrophobic agent; and a second part comprising: (i) a solvent;

wherein, in use, the first and second parts are mixed together to form a composition which is applied to at least a portion of an overhead conductor in order to form a coating or film on at least a portion of the overhead conductor.

The solvent preferably comprises either an aqueous solvent or a non-aqueous solvent.

The solvent may comprise either water or a non-aqueous solvent such as xylene, xylol or dimethylbenzene ($(CH_3)_2C_6H_4$), toluene ($(CH_3)C_6H_5$), ethanol ($C_2H_5OH$), isopropanol ($CH_3CH(OH)CH_3$), 2-ethoxyethanol ($C_2H_5OC_2H_4OH$) or 2-ethoxyethyl acetate ($CH_3C(O)OC_2H_4OC_2H_5$).

The first part may further comprise one or more of: (i) an emissive agent; (ii) a curing agent; (iii) a crosslinking agent; (iv) a flexibility agent; and (v) a rheology agent.

The second part may further comprise one or more of: (i) an emissive agent; (ii) a curing agent; (iii) a crosslinking agent; (iv) a flexibility agent; and (v) a rheology agent.

The kit preferably further comprises a first device for spraying, painting or applying the composition on to at least a portion of one or more overhead conductors to form the coating or film.

According to another aspect there is provided a method of retro-fitting an overhead power transmission or distribution line comprising one or more overhead conductors, the method comprising:

spraying, painting, coating or applying a composition on to at least a portion of an overhead conductor, wherein the composition comprises: (i) a reflective agent; (ii) a photocatalytic agent comprising ≥70 wt % anatase titanium dioxide ($TiO_2$) having an average particle size ("aps")≤100 nm; (iii) a polyorganosiloxane binder; (iv) a superhydrophobic agent; and (v) a solvent; and then allowing the composition to cure.

The solvent preferably comprises either water or a non-aqueous solvent. For example, it is contemplated that a non-aqueous solvent such as xylene, xylol or dimethylbenzene ($(CH_3)_2C_6H_4$), toluene ($(CH_3)C_6H_5$), ethanol ($C_2H_5OH$), isopropanol ($CH_3CH(OH)CH_3$), 2-ethoxyethanol ($C_2H_5OC_2H_4OH$) or 2-ethoxyethyl acetate ($CH_3C(O)OC_2H_4OC_2H_5$) may be utilised.

The step of allowing the composition to cure preferably comprises allowing the composition to cure solely by moisture curing so as to form a coating or film on at least a portion of the overhead conductor.

According to another aspect there is provided a composition for coating an overhead conductor comprising:

a reflective agent;

a polyorganosiloxane binder; and a superhydrophobic agent comprising either: (i) surface functionalised silica nanoparticles; (ii) a functional polysiloxane; or (iii) polymethylsilsesquioxane.

The composition preferably further comprises a photocatalytic agent comprising ≥≥70 wt % anatase titanium dioxide ($TiO_2$) having an average particle size ("aps")≤100 nm.

According to this embodiment it is preferable but not essential that the composition comprises a photocatalytic agent.

The composition according to various preferred embodiments represents a significant advance in the art as an overhead conductor according to the preferred embodiment has both a high average thermal emissivity coefficient E (i.e. E≥0.80, 0.85 or 0.90) across the infrared spectrum 2.5-30.0 μm and also a high average solar reflectivity coefficient R (i.e. R≥0.80, 0.85 or 0.90) across the solar spectrum 0.3-2.5 μm.

It will be recalled that known conductors having a single black coating have a high thermal emissivity coefficient E but a poor solar reflectivity coefficient R. Conversely, other known conductors having a single white coating have a high solar reflectivity coefficient R but a poor thermal emissivity coefficient E.

Accordingly, a single coated conductor according to the present invention has a significantly improved performance in terms of temperature reduction performance relative to conventional single coated conductors. Furthermore, a conductor coated with a coating, film or layer according to the present invention also advantageously is superhydrophobic and hence is effective in preventing dew or salt laden moisture from forming upon an overhead conductor even overnight and/or first thing in the morning. It will be understood that salt laden moisture in a desert environment can be highly corrosive.

A conductor coated with a coating or film according to the present invention therefore has an excellent corrosion resistance in contrast to some known single coatings such as magnesium oxide white paint.

The addition of a photocatalytic agent comprising ≥70 wt % anatase titanium dioxide ($TiO_2$) and preferably having an average particle size s 100 nm results in the photocatalytic conversion of any organic matter which may have adhered or which may otherwise adhere to the coating. In particular, when anatase titanium dioxide ($TiC_2$) is excited by UV light it creates hydroxyl ($OH^-$) and superoxide ($O_2^-$) radicals which will decompose surface organic matter into carbon dioxide ($CO_2$) and water ($H_2O$).

According to an embodiment the photocatalytic agent may comprise a commercially available form of titanium dioxide ($TiC_2$) known as DEGUSSA (EVONIK) (RTM) P25 or AEROXIDE (RTM) $TiC_2$ P25.

DEGUSSA (EVONIK) (RTM) P25 titanium oxide ($TiC_2$) is a conventional powdered form of titanium dioxide ($TiC_2$). The properties of P25 titanium oxide have been investigated in detail and reference is made to the Journal of Photochemistry and Photobiology A: Chemistry, 216(2-3): 179-182 which found that the powder comprised titanium dioxide ($TiO_2$) in the ratio anatase:rutile:amorphous 78:14:8.

It is noted that DEGUSSA (EVONIK) (RTM) P25 is commonly reported as comprising 70:30, 80:20 or 85:15 anatase:rutile crystallites and that no reference is often made to the presence of the amorphous form of titanium dioxide ($TiO_2$).

It has been reported that the average particle size ("aps") of the anatase titanium dioxide ($TiO_2$) in DEGUSSA (EVONIK) (RTM) P25 is approximately 85 nm and that the average particle size of rutile titanium dioxide ($TiC_2$) in DEGUSSA (EVONIK) (RTM) P25 is approximately 25 nm.

Titanium dioxide ($TiO_2$) is particularly preferred as a photocatalyst according to embodiments of the present invention for decomposition of organic pollutants because it is chemically stable and biologically benign. The band gap of titanium dioxide ($TiO_2$) is larger than 3 eV (~3.0 for rutile and ~3.2 for anatase) thereby making pure titanium dioxide ($TiC_2$) primarily active for UV light.

It is believed that the specific phase mixture of different polymorphs of titanium dioxide ($TiO_2$) as are present in DEGUSSA (EVONIK) (RTM) P25 have a synergistic effect and an increased photocatalytic activity is observed compared to pure phases (i.e. either relative to pure rutile titanium dioxide ($TiO_2$) or to pure anatase titanium dioxide ($TiO_2$)).

It is also generally accepted that pure anatase titanium dioxide ($TiO_2$) exhibits a higher photocatalytic activity than pure rutile titanium dioxide ($TiO_2$).

It is known that anatase titanium dioxide ($TiO_2$) has a larger band gap than rutile titanium dioxide ($TiO_2$). While this reduces the light that can be absorbed, it may raise the valence band maximum to higher energy levels relative to redox potentials of adsorbed molecules. Accordingly, the oxidation power of electrons may be increased and electron transfer may be facilitated from the titanium dioxide ($TiO_2$) to the adsorbed molecules.

U.S. Pat. No. 9,595,368 (Ranganathan) discloses the use of photocatalytic self-cleaning coatings both directly on overhead conductors, and on top of intermediate layers such as inorganic silicate coatings or PVDF based coatings designed to increase the emissivity of the conductors. However, such an arrangement is sub-optimal for a number of reasons. The disclosed arrangements are not suitable for white, solar reflective overhead conductors as the use of the disclosed self-cleaning coatings can materially affect the performance of the solar reflective layer.

For example, U.S. Pat. No. 9,595,368 (Ranganathan) discloses that the application of a KON CORPORATION (RTM) self-cleaning layer, in accordance with the manufacturer's application instructions, on top of a solar reflective layer comprising titanium dioxide ($TiO_2$) in a PVDF binder decreased the solar reflectivity of a white coating from 0.89 to 0.77. PVDF is a fluoropolymer with a very low surface energy. As a result, PVDF will repel both aqueous and solvent based coatings with a high water contact angle thereby generally making it difficult to form uniform films on the coating.

As such, the use of an intermediate layer as disclosed in U.S. Pat. No. 9,595,368 (Ranganathan) is not a suitable solution for maintaining solar reflectivity over time.

Further, an intermediate layer approach increases expense of application in the continuous manufacturing process.

To address this, the present invention optionally integrates solar reflectivity and self-cleaning photocatalytic activity into a single layer. Not only does this save on application complexity/expense, but it also avoids self-cleaning top coats materially affecting the optics of the underlying white reflective coating.

A single coated conductor according to the present invention has a significantly improved performance at lower temperatures (e.g. up to 80° C.).

It is not known to provide a single coated conductor which is arranged to have both a very high emissivity E (E≥0.80, 0.85 or 0.90) and also a very high solar reflectance (R≥0.80, 0.85, 0.90) coupled with good or excellent corrosion resistance and a photocatalytic agent which is effective at converting organic matter (which may accrete on the conductor) into carbon dioxide and water.

According to various embodiments the emissivity E of a conductor coated with a coating or film may be such that E≥0.80, E≥0.81, E≥0.82, E≥0.83, E≥0.84, E≥0.85, E ≥0.86, E≥0.87, E≥0.88, E≥0.89, E≥0.90, E≥0.91, E≥0.92, E≥0.93, E≥0.94, E≥0.95, E≥0.96, E≥0.97, E≥0.98 or E≥0.99. Similarly, according to various embodiments the reflectance R may be such that R≥0.80, R≥0.81, R≥0.82, R≥0.83, R≥0.84, R≥0.85, R≥0.86, R≥0.87, R≥0.88, R≥0.89, R≥0.90, R≥0.91, R≥0.92, R≥0.93, R≥0.94, R≥0.95, R ≥0.96, R≥0.97, R≥0.98 or R≥0.99.

Differences between various known conventional approaches and the approach according to the present invention will now be discussed in further detail below.

WO 2015/105972 (Ranganathan) discloses an arrangement comprising a conductor having a single polymeric layer of a carbon black based polymer which is a good infra-red emitter. The emissivity E is stated as being 0.85 (i.e. relatively good) but the absorptivity A is stated as only being 0.3 (i.e. poor).

In contrast, a conductor coated with a coating or film according to the preferred has a significantly improved solar reflectance (R≥0.80) which is significantly superior to the reflectance of the conductor disclosed in WO 2015/105972 (Ranganathan) which is stated as having a lower reflectance of R≥0.70 (based upon a stated absorptivity coefficient A≤0.3).

US 2015/0194237 (Ranganathan) discloses a conductor having a self-cleaning coating comprising a photocatalyst such as anatase titanium oxide. However, the photocatalyst is not provided in a binder—the self-cleaning layer is described as being free of polymer and the photocatalyst is described as being free from a polymeric binder. Accordingly, US 2015/0194237 (Ranganathan) does not disclose providing a coating comprising an inorganic binder. US 2015/0194237 (Ranganathan) does not disclose providing a coating which has a high solar reflectivity R≥80% in the solar spectrum 0.3-2.5 μm.

WO 2014/025420 (Davis) discloses coating an overhead conductor with a single layered coating comprising an inorganic binder (e.g. metal silicate or colloidal silica ($SiO_2$)) and a heat radiating agent such as boron carbide ($B_4C$), titanium dioxide ($TiO_2$) or silicon dioxide ($SiO_2$). A number of different coatings are disclosed as having been formulated and tested.

Out of all the various different formulations disclosed in WO 2014/025420 (Davis) it is considered that perhaps the closest formulation to the present invention is coating #7 which comprises a-silicate binder (20% weight), silicon dioxide (37% weight), boron carbide (3% weight) and water (40% weight). The overall known coating has a dark grey colour with a L* of 43.495. The dark grey coating is stated as having an emissivity E of 0.882. The solar absorptivity A of the dark grey coating #7 disclosed in WO 2014/025420 (Davis) is stated as being A=0.86 which is significantly higher than the requirements of the preferred embodiment of the present invention which requires that the solar absorptivity coefficient A≤0.20. Equally, the solar reflectance of the dark grey coating #7 is R=0.14 which is significantly lower than the requirements of the preferred embodiment which requires the conductor to have a high solar reflectance R≥0.80.

Accordingly, the various compositions disclosed in WO 2014/025420 (Davis) are not considered to be particularly relevant to the present invention.

US 2016/0032107 (Siripurapu) discloses a two part compositional kit for creating a coating to coat a conductor with a single coating. The first part of the kit comprises a filler (2-55% by dry weight of the compositional kit), a cross-linking agent (5-20% by dry weight of the compositional kit) and an emissivity agent (6-42% by dry weight of the compositional kit). The filler may comprise quartz or aluminium oxide. The cross-linking agent may comprise magnesium hydroxide ($Mg(OH)_2$), magnesium oxide (MgO) or zinc oxide (ZnO). The emissivity agent may comprise silicon dioxide ($SiO_2$) or titanium dioxide ($TiO_2$). The second part of the kit comprises an alkali earth metal silicate binder (20-65% by dry weight of the compositional kit). The alkali earth metal silicate binder may comprise potassium silicate sodium silicate, lithium silicate, calcium silicate or magnesium aluminium silicate.

Two examples are given in US 2016/0032107 (Siripurapu). Example #1 has an emissivity E of 0.86 and a high solar absorptivity A of 0.55 which is significantly higher than the requirements of the preferred embodiment which requires the absorptivity coefficient A: 0.20.

Paragraphs [0004] and [0006] of US 2016/0032107 (Siripurapu) teach that different white coatings are known which have a much lower thermal emissivity E≥70% (in the infrared) and a much lower solar reflectivity R≥70% (absorptivity≤30%) in the solar spectrum 0.3-2.5 μm than a coating according to the preferred embodiment of the present invention.

It will be understood by those skilled in the art that a conventional white coated conductor having an E≥70% and a solar reflectivity R≥70% is significantly inferior to a (white) coated conductor according to the preferred embodiment of the present invention which has an E≥80% and a solar reflectivity R≥80%.

According to US 2016/0032107 (Siripurapu) a coating composition for a conductor is disclosed comprising 6-42 wt % of an emissivity agent which may comprise titanium dioxide. Two specific examples are given on page 7 ("Example 1" and "Example 2") and reference is made to Table 1. It is assumed from the context that the titanium dioxide is provided in the rutile form not the less common anatase form according to the present invention especially as no mention is made of photocatalysts. The rutile form as assumed to be disclosed in US 2016/0032107 (Siripurapu) is likely to have an average particle size larger than 100 nm contrary to the requirements of the present invention. According to various preferred embodiments of the present invention an additional reflective agent may be provided in the form of rutile titanium dioxide which has an average particle size of hundreds of nm. The emissivity and solar absorptivity of Example 1 as disclosed in US 2016/0032107 (Siripurapu) was tested and the results are shown in Table 3 of US 2016/0032107 (Siripurapu). It will be noted that the emissivity E is stated as being 86% and the solar absorptivity A is stated as being 55% and hence the corresponding solar reflectivity R is 45%. It will be apparent, therefore, that whilst the emissivity E is high (86%), the solar reflectivity R at 45% is much lower than the requirement of the preferred embodiment of the present invention which requires a solar reflectivity R≥80%.

Accordingly, US 2016/0032107 (Siripurapu) does not disclose providing a single coated conductor having a photocatalytic agent comprising ≥70 wt % anatase titanium dioxide which provides a coating having a solar reflectivity R≥80% as is required by the preferred embodiment of the present invention.

US 2005/0266981 (Nakajima) discloses providing a liquid composition that includes a photocatalytic material dispersed in a hydrophilic binder that includes an essentially completely hydrolysed organosilicate (paragraph [0002]). According to paragraph [0093] the liquid composition may be applied to a high voltage cable. However, the preferred embodiment of the present invention relates to a single coated conductor for an overhead power transmission or distribution line. Applying a liquid composition as disclosed in US 2005/0266981 (Nakajima) to a high voltage cable would result in an electrical conductor which had two coatings—a first inner insulating coating and a second outer hydrophilic coating and as such would not meet the requirements of the preferred embodiment of the present invention which relates to the provision of a single monolithic coating on an electrical (metal) conductor.

WO 2007/034248 (Simic) discloses a number of white coatings. One disclosed coating is magnesium oxide aluminium oxide paint. This is reported as having a low absorptivity and a high emissivity. The preferred embodiment of the present invention is different in that according to the present invention a photocatalytic agent comprising anatase titanium dioxide ($TiO_2$) is included along with a polyorganosiloxane binder and a superhydrophobic agent. Furthermore, magnesium oxide aluminium oxide paint has been tested but has been found, to have an inferior performance to that stated in WO 2007/034248 (Simic). The paint is also problematic to apply and cure and is not considered to be durable. Accordingly, magnesium oxide aluminium oxide paint is not considered to present a commercial solution.

Another problem with attempting to use magnesium oxide as a coating is that magnesium oxide will act as a sacrificial corrosion primer as it corrodes very easily. Accordingly, the optical properties of the magnesium oxide coating will deteriorate rather rapidly. Magnesium is the most electrochemically active metal used in engineering applications and corrodes so readily in some environments that magnesium and magnesium alloys are purposely utilised as sacrificial anodes on steel structures such as ship hulls and steel pipes. Magnesium and magnesium alloys stored at room temperature or in humid atmospheric conditions develop a compositionally varied surface film consisting of magnesium oxide, hydroxide and carbonates. These films are less stable than the passive films formed on metals such as aluminium and stainless steels.

It has also been observed that magnesium rich primers fail rapidly and exhibit heavy blistering very early on in salt spray tests (ASTM B117) which is a key test for certifying coatings for corrosion protection.

Accordingly, the magnesium oxide white paint coating disclosed in WO 2007/034248 (Simic) is not considered to be relevant to the present invention and is not considered as offering a practical commercial solution to the problems which the present invention seeks to address.

FR-2971617 (Nexans) discloses a white paint having a white pigment such as magnesium oxide, aluminium oxide or barium sulphate. The polymeric coating has an emissivity E≥0.7 and a solar absorption coefficient A≤0.3. Accordingly, it is apparent that the requirements of the preferred embodiment of the present invention are not met.

It will be apparent, therefore, that the various known approaches to providing a coating which will reduce the temperature of an overhead conductor are limited to providing a single coating which does not meet the dual requirements of the preferred embodiment of the present invention namely of providing a conductor which has both a high emissivity E≥0.80 and also a high solar reflectivity R≥0.80 (or conversely a low solar absorptivity A≤0.20).

It will be apparent, therefore, that the present invention represents a significant advance in the art since a single coated conductor according to the present invention has a significantly improved temperature performance, anti-corrosion properties and self-cleaning properties. As a result, a conductor coated with a coating or film according to the present invention exhibits advantageously reduced power losses and further advantageously has a higher ampacity relative to conventional monolayer coated conductors or bare conductors.

A single coated conductor having superhydrophobic properties according to the present invention also has excellent corrosion resistance in contrast to some known coatings and is particularly effective at preventing salt laden dew or moisture from forming upon the conductor. It will be appreciated that in a desert environment such as in the Middle East or the Gulf then salt laden moisture is potentially highly corrosive.

Furthermore, a significant advantage of the single coating according to the present invention is that the presence of a photocatalytic agent which preferably acts to convert organic matter which may have accreted onto the conductor into carbon dioxide and water. As a result, a single coated conductor according to the present invention will suffer less discolouration than other known temperature reducing white coatings applied to overhead power transmission or distribution lines and hence the performance of such coated conductors according to the present invention will remain high over an extended period of time. This is in contrast to known coated conductors which suffer from a marked deterioration in performance over a relatively short period of time due to becoming dirty, discoloured and having a reduced reflectance.

It will be appreciated, therefore, that a conductor coated with a coating or film according to the present invention which includes a self-cleaning photocatalytic agent in the form of anatase titanium dioxide ($TiO_2$) and a superhydrophobic agent is of significant commercial interest.

The photocatalytic agent preferably further comprises ≥75%, ≥80%, ≥85%, 90%, ≥95% or ≥99% wt % anatase titanium dioxide ($TiO_2$).

A conductor coated with a coating or film may be arranged and adapted to operate, in use, at a temperature of 60-300° C. or 90-250° C. above ambient temperature.

According to various embodiments a conductor coated with a coating or film may further comprise a reflective agent.

According to another aspect of the present invention there is provided a composition for coating an overhead conductor comprising:

a reflective agent;

a photocatalytic agent comprising ≥70 wt % anatase titanium dioxide ($TiO_2$) having an average particle size ("aps")≤100 nm; and a polyorganosiloxane binder.

The composition preferably further comprises a superhydrophobic agent. According to various embodiments, the superhydrophobic agent may comprise either: (i) surface functionalised silica nanoparticles; (ii) a functional polysiloxane; or (iii) polymethylsilsesquioxane.

According to another aspect there is provided a method of coating or applying a film to an overhead conductor comprising:

applying a composition as described above to at least a portion of an overhead conductor; and allowing the composition to cure.

According to another aspect there is provided a kit for forming a composition for coating an overhead conductor comprising:

a first part comprising: (i) a reflective agent; (ii) a photocatalytic agent comprising ≥70 wt % anatase titanium dioxide ($TiO_2$) having an average particle size ("aps") ≤100 nm; and (iii) a polyorganosiloxane binder;

a second part comprising: (i) a solvent;

wherein, in use, the first and second parts are mixed together to form a composition which is applied to at least a portion of an overhead conductor in order to form a coating or film on at least a portion of the overhead conductor.

According to a preferred embodiment the first part may further comprise a superhydrophobic agent such as either: (i) surface functionalised silica nanoparticles; (ii) a functional polysiloxane; or (iii) polymethylsilsesquioxane.

BRIEF DESCRIPTION OF THE DRAWINGS

Various embodiments of the present invention together with other arrangements given for illustrative purposes will now be described, by way of example only, and with reference to the accompanying drawings in which.

DETAILED DESCRIPTION

Various embodiments of the present invention together with both conventional arrangements and other arrangements which have not been disclosed to the public but which are not intended to fall within the scope of the present invention but which instead are given for illustrative purposes will now be discussed in more detail.

Figure 1:
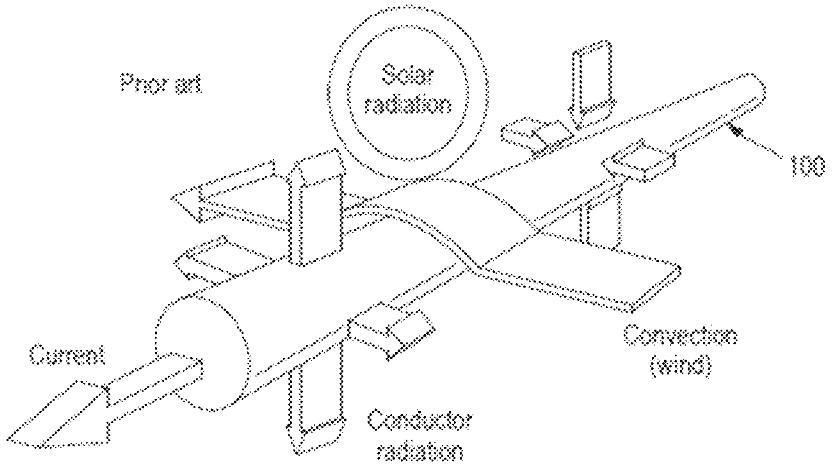
FIG. 1 illustrates some of the heat transfer mechanisms associated with an overhead electrical conductor including gaining energy by solar radiation and losing energy by conductor radiation and by convection (wind)

FIG. 1 illustrates some of the heat transfer mechanisms associated with an overhead conductor 100.

There are two predominate heat transfer mechanisms which will cause the temperature of the conductor 100 to rise. The first heat transfer mechanism is solar radiative heating of the conductor 100. It will be understood that incident solar radiation upon the conductor 100 will result in the temperature of the electrical conductor 100 increasing.

The second heat transfer mechanism (not shown in FIG. 1) which will cause the temperature of the conductor 100 to rise is the effect of Ohmic losses due to the transmission of electrical current through the conductor 100. The resistance of the conductor 100 to the transmission of electrical current through the conductor 100 will result in Joule heating of the conductor 100.

Accordingly, the combined effect of solar radiative heating of the conductor 100 and Joule heating will cause the temperature of the conductor 100 to rise.

The gain in energy of the conductor 100 may be offset by three thermal transfer mechanisms through which the conductor 100 may lose energy namely by radiation, conduction and convection.

Heat loss by conduction is negligible. Heat loss by convection (i.e. due to air currents or wind) will be dependent upon the geographic location of the conductor 100. A conductor 100 may be deployed in a hot region of the world such as Southern USA, the Middle East or Australia. Winds in non-coastal regions may be relatively light and hence heat loss by convection may not normally be a significant consideration. Accordingly, the predominant mechanism by which a conductor 100 may lose energy is by thermal radiation.

It will be understood by those skilled in the art that overhead bare conductors as are conventionally deployed in regions of the world such as Southern USA, the Middle East and Australia can reach significantly elevated temperatures. Accordingly, the issue of being able to reduce the operational temperature of an overhead conductor deployed in a region of the world such as Southern USA, the Middle East and Australia is of considerably commercial concern to e.g. utilities companies.

High voltage power lines in many countries are considered to form part of the national infrastructure and hence may be state owned and controlled.

Overhead electricity transmission lines generally comprise a core formed of one or more conductive wires. Various different types of overhead conductors are known.

All Aluminium Conductors ("AAC") comprise hard drawn aluminium wires stranded in successive layers in opposite directions to form the conductor as per BS EN 50182 or IEC 61089. AAC conductors may be used for aerial distribution lines having relatively short spans, aerial feeders and bus bars of substations. AAC conductors have a high corrosion resistance since steel is not present. Conventional AAC conductors are typically rated up to a maximum operating temperature of 80° C.

All Aluminium Alloy Conductors ("AAAC") comprise All Aluminium Alloy ("ALMELEC") wires stranded in successive layers in opposite directions to form the conductor as per IEC 61089, BS EN 50182 or ASTM B 399. AAAC conductors are mainly used for overhead lines in transmission and distribution electrical networks having relatively long spans. They are also used as a messenger to support overhead electrical cables. AAAC conductors have a high corrosion resistance since steel is not present. Conventional AAAC conductors are typically rated up to a maximum operating temperature of 80° C.

Aluminium Conductor Steel Reinforced ("ACSR") conductors comprise an outer layer of aluminium conductor concentrically stranded over a central core of galvanized or stranded steel wires to fon-n the conductor as per BS EN 50182, ASTM B 232 or IEC 61089. ACSR conductors are widely used for electrical power transmission over long distances. ACSR conductors may also be used as a messenger for supporting overhead electrical cables. Conventional ACSR conductors are typically rated up to a maximum operating temperature of 80° C.

Aluminium Conductor Aluminium Clad Steel Reinforced ("ACSR/AW") conductors comprise an outer layer of aluminium conductor concentrically stranded over a central core of aluminium clad steel solid or stranded cable to form the conductor as per ASTM B 549. ACSR/AW conductors are used for electrical power transmission and are ideal for long overhead lines spans like ACSR conductors but with slightly better resistance and current carrying capacity in addition to good corrosion resistance. Conventional ACSR/AW conductors are typically rated up to a maximum operating temperature of 80° C.

Areal Bundled Cables ("ABC") are made from aluminium conductors which are insulated by XLPE insulation and assembled to form two (Duplex), three (Triplex), four (Quadruplex) or more conductors as per ICEA S 474-76 or BS EN 50182. They are used for secondary overhead lines (in circuits not exceeding 600 V phase to phase) on poles or as feeders to residential premises.

Various High Temperature Low Sag ("HTLS") conductors are also known which are designed to operate at significantly higher operational temperatures of up to 150-250° C.

Known HTLS conductors include Aluminium Conductor Composite Core ("ACCC") conductors, Aluminium Conductor Steel Supported ("ACSS/MA") conductors, Aluminium Conductor Aluminium Clad Steel Supported ("ACSS/AW") conductors, Thermal Resistant Aluminium Alloy Conductor Steel Reinforced ("TACSR") conductors, Thermal Resistant Aluminium Alloy Conductor Aluminium Clad Steel Reinforced ("TACSR/AW") conductors and Super Thermal Resistant Aluminium Alloy Conductor Aluminium Clad Invar Reinforced ("STACIR/AW") conductors.

Aluminium Conductor Composite Core ("ACCC") conductors comprise a concentrically stranded conductor with one or more layers of trapezoidal shaped annealed 1350-O aluminium wires on a central core of light weight carbon-glass fibre composite. ACCC conductors comprising a hybrid carbon composite core are stronger and lighter than traditional steel cores. ACCC conductors are capable of carrying twice the current of traditional ACSR conductors as ACCC conductors are designed for continuous operating temperatures of up to 180° C. in addition to its lighter core which allows approx. 30% more aluminium to be used without increasing the total weight. Usage of ACCC conductors reduces line losses by 30-40% under equal load conditions compared with traditional ACSR conductors of the same diameter and weight. ACCC conductors have greater strength, effective self-damping, superior fatigue resistance and a low coefficient of expansion thereby reducing conductor sag under heavy electrical load conditions. As a result, ACCC conductors can be used to increase spans between fewer or shorter structures. ACCC conductors have greater corrosion resistance than traditional ACSR conductors.

ACCC conductors are used for overhead distribution and transmission lines and are particularly useful in reconductoring applications requiring increased current with existing tensions and clearances, new line applications where structures can be economised due to reduced conductor sag, new line applications requiring high emergency loading and lines where vibration due to wind is a problem. ACCC conductors can also be used at corrosive and coastal environments due to their good corrosion resistance. Conventional ACCC conductors are typically rated up to a maximum operating temperature of 180° C.

Aluminium Conductor Steel Supported ("ACSS/MA") conductors comprise one or more layers of annealed aluminium 1350-O wires stranded over a central core of zinc-5% aluminium mischmetal alloy coated steel wires that are designed to withstand most or all of the mechanical load on the ACSS conductor. ACSS conductors may be manufactured according to ASTM B 856.

ACSS/MA conductors are similar to traditional ACSR conductors except that ACSS/MA conductors can be operated continuously at high temperatures up to 250° C. without damage. ACSS/MA conductors sag less under emergency loading than ACSR conductors, have self-damping properties and final sag is not affected by long time creep of the aluminium.

ACSS/MA conductors are used for overhead distribution and transmission lines and are particularly useful in reconductoring applications requiring increased current with existing tensions and clearances. ACSS/MA conductors are also used for new line applications where structures can be economised due to reduced conductor sag, new line applications requiring high emergency loadings and lines where vibration due to wind is a problem. Conventional ACSS/MA conductors are typically rated up to a maximum operating temperature of 250° C.

Aluminium Conductor Aluminium Clad Steel Supported ("ACSS/AW") conductors comprise one or more layers of annealed aluminium 1350-O wires stranded over a central core of aluminium clad steel wires that are designed to withstand most or all of the mechanical load on ACSS/AW conductors. ACSS/AW conductors may be manufactured according to ASTM B 856.

ACSS/AW conductors can operate continuously at high temperatures up to 200° C. without damage. The aluminium clad steel core which consists of a thick layer of aluminium (approx. 10% of the nominal wire radius) over steel gives ACSS/AW conductors the advantages of ACSS conductors along with light weight and good conductivity of aluminium with the high tensile strength and ruggedness of steel.

ACSS/AW conductors are used for overhead distribution and transmission lines and are especially useful in reconductoring applications requiring increased current with existing tensions and clearances. ACSS/AW conductors are also used for new line applications where structures can be economised due to reduced conductor sag, new line applications requiring high emergency loadings and lines where vibration due to wind is a problem.

ACSS/AW conductors have strength characteristics similar to ACSS conductors along with slightly greater ampacity and resistance to corrosion due to aluminium cladding of the steel core wires. Conventional ACSS/AW conductors are typically rated up to a maximum operating temperature of 200° C.

Thermal Resistant Aluminium Alloy Conductor Steel Reinforced ("TACSR") conductors comprise one or more layers of thermal resistant aluminium zirconium alloy (AT1) wires stranded over a central core of zinc coated steel wire(s) as per IEC 62004 and IEC 60888 and generally according to IEC 61089.

TACSR conductors are able to carry higher (150%) load current than traditional ACSR conductors as they are designed for continuous operating temperatures of up to 150° C. TACSR conductors have the same installation technique as ACSR conductors.

TACSR conductors are used for overhead distribution and transmission lines and are particularly useful in new line applications requiring increased current. Conventional TACSR conductors are typically rated up to a maximum operating temperature of 150° C.

Thermal Resistant Aluminium Alloy Conductor Aluminium Clad Steel Reinforced ("TACSR/AW") conductors comprise one or more layers of thermal resistant aluminium zirconium alloy (AT1) wires stranded over a central core of stranded aluminium clad steel (20SA Type A) wire(s) as per IEC 62004 and IEC 61232 and generally according to IEC 61089.

TACSR/AW conductors are able to carry higher load current than traditional ACSR conductors as they are designed for continuous operating temperatures of up to 150° C. TACSR/AW conductors have increased corrosion resistance and lower electrical resistance and lower mass than TACSR conductors. TACSR/AW conductors have the same installation technique as ACSR conductors.

TACSR/AW conductors are used for overhead distribution and transmission lines and are particularly useful in new line applications requiring increased current. TACSR/AW may be used at corrosive and coastal environments due to their good corrosion resistance. Conventional TACSR/AW conductors are typically-rated up to a maximum operating temperature of 150° C.

Super Thermal Resistant Aluminium Alloy Conductor Aluminium Clad Invar Reinforced ("STACIR/AW") conductors comprise one or more layers of super thermal resistant aluminium zirconium alloy (AT3) wires stranded over a central core of stranded aluminium clad invar wires as per IEC 62004 and generally according to IEC 61089 and IEC 61232. Invar is a special Fe/Ni alloy having a very low coefficient of linear expansion.

STACIR/AW conductors are able to carry higher (200%) load current than traditional ACSR conductors as they are designed for continuous operating temperatures of up to 210° C. Beyond knee point STACIR/AW conductors experience a sag increase due to the expansion of the Invar core alone (extremely low value $\leq 3.7\times10^{-6}$/° C.) which controls sag at high operating temperatures. STACIR/AW conductors have increased corrosion resistance and have the same installation technique as ACSR conductors.

STACIR/AW conductors are used for overhead distribution and transmission lines and are particularly useful in new line applications requiring increased current. STACIR/AW conductors may be used at corrosive and coastal environments due to their good corrosion resistance. Conventional STACIR/AW conductors are typically rated up to a maximum operating temperature of 210° C.

Accordingly, known HTLS conductors enable high voltage overhead electric conductors to be operated at significantly higher operating temperatures up to a maximum operating temperature typically in the range 150-250° C.

Figure 2A:
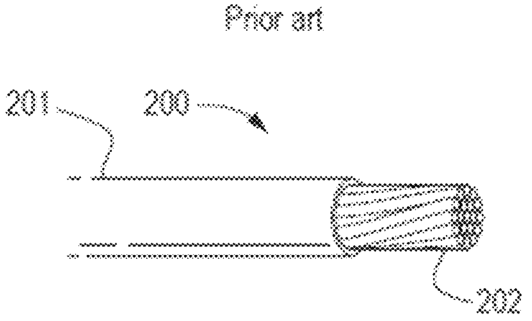
FIG. 2A shows a side view of a known coated conductor and FIG. 2B shows a cross-sectional view of the known coated conductor.
Figure 2B:
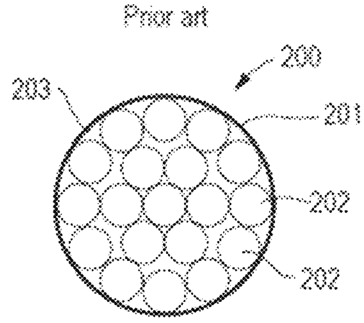

FIG. 2A shows a side view and FIG. 2B shows a cross-sectional view of a known coated conductor 200 as disclosed in WO 2015/105972 (Ranganathan). The known conductor 200 comprises 19 aluminium cables or wires 202 surrounded by an outer polymeric coating 201. Gaps 203 may be present between the outer polymeric coating 201 and the individual conductive cables or wires 202. The outer polymeric coating 201 is provided in order to decrease the temperature of the conductor 200 when the conductor 200 is tested in accordance with ANSI C119.4.

Figure 3A:
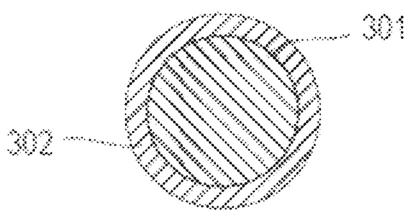
FIG. 3A shows a cross-sectional view of a known single coated conductor.

FIG. 3A shows a cross-sectional view of another known conductor having a central aluminium core 301 and a single outer polymeric coating 302.

Figure 3B:
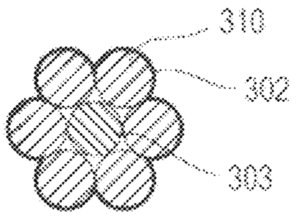
FIG. 3B shows a cross-sectional view of a known 6/1 ACSR conductor with a coating.

FIG. 3B shows a cross-sectional view of a known 6/1 ACSR conductor comprising a central steel reinforcing element 303 surrounded by a ring of six aluminium electrical wires 310. Each of the six aluminium wires 310 has a polymeric coating 302.

Figure 3C:
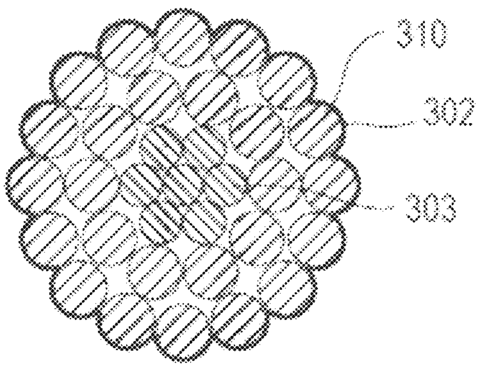
FIG. 3C shows a cross-sectional view of a known 26/7 ACSR conductor with a coating and FIG. 3D shows a cross-sectional view of a known 54/19 ACSR conductor with a coating.

FIG. 3C shows a cross-sectional view of a known 26/7 ACSR conductor comprising seven central steel reinforcing elements 303 surrounded by a first ring of aluminium wires 310 which in turn are surrounded by a second ring of aluminium wires 310. The second outer ring of aluminium wires are enclosed by an outermost polymeric coating 302.

Figure 3D:
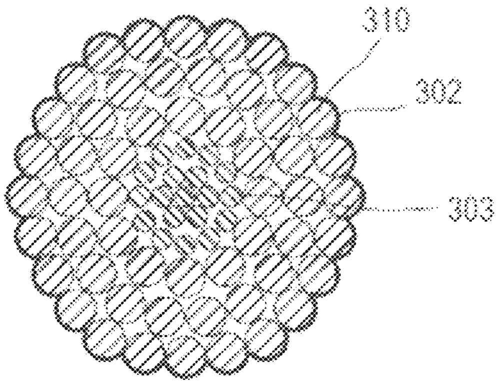

FIG. 3D shows a known 54/19 ACSR conductor comprising 19 central steel reinforcing elements 303 surrounded by a first ring of aluminium wires 310 which are in turn surrounded by a second ring of aluminium wires 310. The second ring of aluminium wires 310 are in turn surrounded by a third ring of aluminium wires 310. The third outer ring of aluminium wires 310 is enclosed by an outermost polymeric coating 302.

Figure 4:
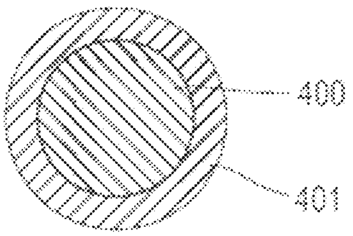
FIG. 4 shows a single coated conductor according to a preferred embodiment of the present invention.

FIG. 4 shows a single coated conductor according to a preferred embodiment of the present invention. A conductor coated with a coating or film comprises an inner metallic conductor 400 preferably of aluminium. The inner metallic conductor 400 may comprise one or more steel reinforcing elements (not shown) and/or one or more composite elements.

A conductor coated with a coating or film according to a preferred embodiment of the present invention preferably comprises a first coating 401 surrounding the metallic conductor 400. The coating or film 401 includes a self-cleaning photocatalytic agent comprising anatase titanium dioxide ($TiO_2$). The first coating 401 preferably forms a single monolithic layer, coating or film on the metallic conductor 400 in contrast to some known arrangements which comprise two or more different layers or coatings.

According to various embodiments one or more electrical conductors 400 are provided which have a coating or film or layer 401 which has an average thermal emissivity coefficient E≥0.80, 0.85 or 0.90 and an average solar reflectivity coefficient R≥0.80, 0.85 or 0.90 and/or an average solar absorptivity coefficient A≤0.10, 0.15 or 0.20.

The one more electrical conductors 400 may form part of an overhead power transmission or distribution line.

The coating, film or layer 401 preferably comprises a reflective agent, a photocatalytic agent comprising ≥70 wt % anatase titanium dioxide ($TiO_2$) having an average particle size ("aps")≤100 nm, a polyorganosiloxane binder and a superhydrophobic agent comprising either: (i) surface functionalised silica nanoparticles; (ii) a functional polysiloxane; or (iii) polymethylsilsesquioxane.

The coating or film or layer 401 preferably comprises a binder which is either water based or solvent based. According to the present invention a composition for coating an overhead conductor is provided. The composition preferably cures by moisture curing to form the coating, film or layer 401.

The coating or film or layer 401 preferably has an average thermal emissivity coefficient E≥0.80, 0.85 or 0.90 across at least 10%, 20%, 30%, 40%, 50%, 60%, 70%, 80% or 90% of the infrared spectrum 2.5-30.0 μm.

The coating or film or layer 401 preferably has an average solar reflectivity coefficient R≥0.80, 0.85 or 0.90 and/or an average solar absorptivity coefficient A≤0.10, 0.15 or 0.20 across at least 10%, 20%, 30%, 40%, 50%, 60%, 70%, 80% or 90% of the solar spectrum 0.3-2.5 μm.

According to an embodiment the coating or film 401 may be provided on at least a portion of the one or more electrical conductors 400.

A single coated conductor according to the present invention has been tested and found to have a good or excellent corrosion resistance when tested in accordance with ASTM B117 (Salt spray) testing procedure.

Using the industry standard CIGRE 207-2002 method of calculating conductor temperature the importance of utilising a single coated conductor having a high solar reflectivity coating in regions with high solar radiation will now be demonstrated. For illustrative purposes only, a power line may be considered which is deployed at a location 30° North in latitude and which is exposed to 12 hours of August solar radiation. The air temperature is modelled as being 40° C.

Under the above conditions a Drake ACSR overhead electrical conductor with different coatings transmitting a constant current of 1000 A will have the following characteristics:

TABLE 1

| Optical characteristics | Conductor temperature (° C.) | Conductor resistance Ohms/km |
|---|---|---|
| Uncoated conductor<br>Emissivity: 0.5<br>Absorptivity: 0.5<br>Reflectivity: 0.5 | 99.1 | 0.0945 |
| Conductor having a grey emissive coating<br>Emissivity: 0.86<br>Absorptivity: 0.55<br>Reflectivity: 0.45 | 91.1 | 0.0921 |
| A single coated conductor according to a preferred embodiment of the present invention having both high emissivity and high reflectivity<br>Emissivity: 0.95<br>Absorptivity: 0.1<br>Reflectivity: 0.9 | 83.3 | 0.0898 |

The figures shown above in Table 1 were calculated using the industry standard CIGRE model and demonstrate that a single coated conductor according to a preferred embodiment of the present invention having both high reflectivity and high emissivity results in nearly a doubling of the cooling effect (xl.975 15.8° C. c.f. 8.0° C.) relative to a conventional conductor having a grey coating. As detailed below, the above calculations were further confirmed through empirical testing using two different test rigs.

A single coated conductor according to a preferred embodiment of the present invention having both an increased emissivity and at the same time a high reflectivity (i.e. without increasing solar absorption) is shown to be particularly effective and to provide a significantly improved performance relative to conventional arrangements operating at temperatures up to 100° C. (as per Table 1 above) and also at elevated temperatures in the range 150-250° C. (data shown below).

The coating or film 401 may comprise a white filler. The white filler may, for example, comprise: (i) magnesium oxide (MgO); (ii) calcium oxide (CaO); (iii) aluminium oxide ($Al_2O_3$); (iv) zinc oxide (ZnO); (v) calcium carbonate ($CaCO_3$); (vi) aluminium silicate ($Al_2SiO_5$); (vii) titanium dioxide ($TiO_2$); or (viii) barium sulphate ($BaSO_4$). The coating or film 401 may include one or more other white fillers.

According to various embodiments the coating or film 401 preferably comprises a polyorganosiloxane binder. The polyorganosiloxane binder may comprise a water based binder or a solvent based binder.

The first polyorganosiloxane coating 401 may comprise one or more braids, ceramic fibres, adhesives yarns or special tapes.

The first polyorganosiloxane coating 401 may be semi-conductive and may have a volume resistivity of $10^{12}$ ohm-cm or less, preferably a volume resistivity of $10^{10}$ ohm-cm or less, further preferably a volume resistivity of $10^1$ ohm-cm or less.

The first polyorganosiloxane coating 401 may have a thermal deformation temperature in the range 140-150° C., 150-160° C., 160-170° C., 170-180° C., 180-190° C., 190-200° C., 200-210° C., 210-220° C., 220-230° C., 230-240° C., 240-250° C., 250-260° C., 260-270° C., 270-280° C., 280-290° C., 290-300° C. or >300° C.

The first polyorganosiloxane coating 401 may have a retention of elongation at break of 50% or more after 2000 hours of exterior weathering test in accordance with ASTM 1960.

The first polyorganosiloxane coating 401 may have a heat conductivity of 0.15 W/m or more.

The coating or film 401 may less preferably have a lightness value L* in the range 0-10, 10-20, 20-30, 30-40, 40-50, 50-60, 60-70, 70-80. More preferably, the coating or film 401 is white and has a lightness value L* in the range 80-90 or 90-100 wherein when L*=0 the observed colour is black and wherein when L*=100 the observed colour is white. According to the preferred embodiment the coating 401 has a L*≥80.

Fillers

In a similar manner to the arrangements disclosed in WO 2015/105972 (Ranganathan) according to various embodiments of the present invention the first polyorganosiloxane coating 401 may include one or more fillers. The first polyorganosiloxane coating 401 may contain one or more fillers at a concentration of 0-50% (by weight of the total composition) and the one or more fillers may have an average particle size of 0.1-50 μm. The filler particles may be spherical, hexagonal, flake like, fibres or ribbon like.

IR Reflective Additives

In a similar manner to the arrangements disclosed in WO 2015/105972 (Ranganathan) according to various preferred embodiments of the present invention, the first polyorganosiloxane coating 401 may comprise one or more infrared reflective pigments or additives. The one or more infrared reflective ("IR") pigments or additives may be included in the first polyorganosiloxane coating 401 at a concentration from e.g. 0.1-10 wt %. The IR reflective additives are preferably white.

Stabilisers

In a similar manner to the arrangements disclosed in WO 2015/105972 (Ranganathan) according to various preferred embodiments of the present invention one or more stabilisers may be included in the first polyorganosiloxane coating 401 at a concentration of e.g. 0.1-5% (by weight of the total composition or coating).

The one or more stabilisers may comprise a light stabiliser and/or a dispersion stabiliser such as bentonite. The stabiliser is preferably white.

Coating Process

The first polyorganosiloxane coating 401 or a first mixture may be applied to one or more conductors 400 such as an overhead cable by being sprayed or painted on. The coating or film or first mixture may (less preferably) be water based and may be dehydrated or dried e.g. by thermal curing optionally over a period of hours.

However, more preferably the coating or film is solvent based and is cured solely by moisture curing or ambient temperature via a curing agent i.e. is not subjected to thermal curing.

One or more pre-treatment processes may be used to prepare a surface of the conductor 400 or one or more conductive wires for the first inorganic coating 401. For example, according to various embodiments the conductor 400 or one or more conductive wires may be subjected to chemical treatment, pressurised air cleaning, hot water treatment, steam cleaning, brush cleaning, heat treatment, sand blasting, ultrasound, deglaring, solvent wipe, plasma treatment and the like.

A surface of one or more overhead conductors 400 may be deglared by sand blasting. An overhead conductor may be heated to temperatures between 23-250° C. as part of a heat treatment process to prepare the surface of the conductor 400 or one or more conductive wires for the coating or film 401. The temperature may be selected dependent upon the coating or film 401.

In certain embodiments, the coating processes may be solvent free or essentially solvent free. Solvent free, or essentially solvent free may mean that no more than about 1% of a solvent is used in any of the processes relative to the total weight of the product.

Characteristics of Coated Conductors

As will be appreciated, the application of a single coating or monolayer 401 provides cables, such as overhead conductors, with a number of superior characteristics including self-cleaning properties.

The first polyorganosiloxane coating 401 may provide a cable with a uniform thickness around the exterior of the conductor 400 or one or more conductive wires. Each method of applying the first polyorganosiloxane coating 401 may compensate for differing amounts of unevenness.

The coating or film layer 401 according to various preferred embodiments of the present invention may provide the conductor 400 or one or more conductive wires with an increased mechanical strength relative to that of a bare conductor. For example, according to various embodiments a single coated conductor 400 or one or more conductive wires may have a minimum tensile strength of 10 MPa and may have a minimum elongation at break of 50% or more.

As another advantage, a single coating 401 may in a similar manner to the arrangements disclosed in WO 2015/105972 (Ranganathan) serve as a protective layer against corrosion and bird caging in the conductor 400 or one or more conductive wires. As may be appreciated, bare or liquid coated conductors may lose their structural integrity over time and may become vulnerable to bird caging in any spaces between the conductor wire strands. In contrast, a conductor 400 or one or more conductive wires having a single coating 401 are shielded and may eliminate bird caging problems.

As another advantage, the first polyorganosiloxane coating 401 in combination with a superhydrophobic agent may eliminate water penetration, may reduce ice and dust accumulation and may improve corona resistance.

As another advantage, a conductor 400 or one or more conductive wires coated with a single coating 401 may have an increased heat conductivity, an increased emissivity and decreased absorptivity characteristics.

As an additional advantage, the first polyorganosiloxane coating 401 may have a thermal deformation resistance at higher temperatures including temperatures of 140-150° C., 150-160° C., 160-170° C., 170-180° C., 180-190° C., 190-200° C., 200-210° C., 210-220° C., 220-230° C., 230-240° C., 240-250° C., 250-260° C., 260-270° C., 270-280° C., 280-290° C., 290-300° C. or >300° C.

Advantageously, the first polyorganosiloxane coating 401 may maintain flexibility at lower temperatures and may have improved shrink back and low thermal expansion at the lower temperature range.

The addition of the first polyorganosiloxane coating 401 may add relatively little weight to an overhead conductor 400. For example, the weight increase of a single coated overhead conductor according to a preferred embodiment of the present invention may be <5%, 5-10%, 10-15% or 15-20%.

A yet further significant advantage is that the first polyorganosiloxane coating 401 has an excellent corrosion resistance in contrast to other known coatings.

Experimental Data

Various simulations were performed following CIGRE technical specification 601, further details of which are given below.

For steady state situations, fixed weather and conductor parameters were assumed in order to calculate the maximum expected ratings or conductor temperatures. The environmental data were chosen to represent a hot, cloudless, sunny subtropical desert location, as detailed below.

TABLE 2

| Environmental data | |
|---|---|
| Location | 30 Degrees North |
| Date | 10th June |
| Time | 12 hours |
| Ambient temperature (° C.) | 40 |
| Wind velocity perpendicular to conductor (m/s) | 0.6096 |
| Conductor orientation | E-W |
| Atmospheric conditions | Clear |
| Albedo | 0.1 |
| Calculated solar irradiance (W/$m^2$) | Varied from night to noon |

Reduction in Operating Temperature

Generally, a new uncoated conductor will have an emissivity E=0.5 and solar absorptivity A=0.5. Over the course of a year the emissivity E of an uncoated conductor will increase to e.g. approx. 0.8 as the surface of conductor becomes coated with organic matter and/or is exposed to pollution. Similarly, the absorptivity will also increase during the course of the year to 0.8. These figures are dependent upon location and it will be understood, for example, that if the conductor is located in a less polluted location then the final values may end up being different (e.g. higher/lower).

Table 3 below shows current and temperature as a function of surface characteristics.

TABLE 3

| | Aged uncoated Drake conductor E = 0.8 A = 0.8 | New uncoated Drake conductor E = 0.5 A = 0.5 | Conductor having a preferred coating E = 0.95 A = 0.1 |
|---|---|---|---|
| Current at 100° C. (A) | 907 | 908 | 1126 |
| Temperature (° C.) at 976 Amps | n/a | 99.9 | 78.75 |
| Increase in current | n/a | 1 | 119 |
| $I^2R$ power savings (running at a cooler temperature) | n/a | n/a | 6% |

It will be understood that Drake ACSR conductors are commonly used for CIGRE simulations.

Increase in Ampacity

Table 4 below shows how the ampacity varies with time of day and corresponding solar irradiance for a perfect conductor, an aged conductor, a new uncoated conductor and a coated conductor according to a preferred embodiment.

TABLE 4

| Time of Day | Total Solar Irradiance (W/$m^2$) | Theoretical perfect Drake conductor (26/7) E = 1.0 A = 0.0 Current (A) | Drake conductor (26/7) after 1 year E = 0.8 A = 0.8 Current (A) | New Drake conductor (26/7) E = 0.5 A = 0.6 Current (A) | Drake conductor (26/7) with a preferred coating E = 0.95 A = 0.1 Current (A) | % Uplift on E=0.8 A=0.8 | % Uplift on E=0.5 A=0.5 |
|---|---|---|---|---|---|---|---|
| 04:00:00 | 0 | 1161 | 1115 | 1043 | 1149 | 3% | 10% |
| 05:00:00 | 0 | 1161 | 1115 | 1043 | 1149 | 3% | 10% |
| 06:00:00 | 266 | 1161 | 1078 | 1018 | 1145 | 6% | 12% |
| 07:00:00 | 463 | 1161 | 1044 | 996 | 1141 | 9% | 15% |
| 08:00:00 | 689 | 1161 | 1006 | 971 | 1137 | 13% | 17% |
| 09:00:00 | 911 | 1161 | 967 | 946 | 1133 | 17% | 20% |
| 10:00:00 | 1093 | 1161 | 935 | 926 | 1129 | 21% | 22% |
| 11:00:00 | 1210 | 1161 | 914 | 912 | 1127 | 23% | 24% |
| 12:00:00 | 1251 | 1161 | 907 | 908 | 1126 | 24% | 24% |

Figure 5:
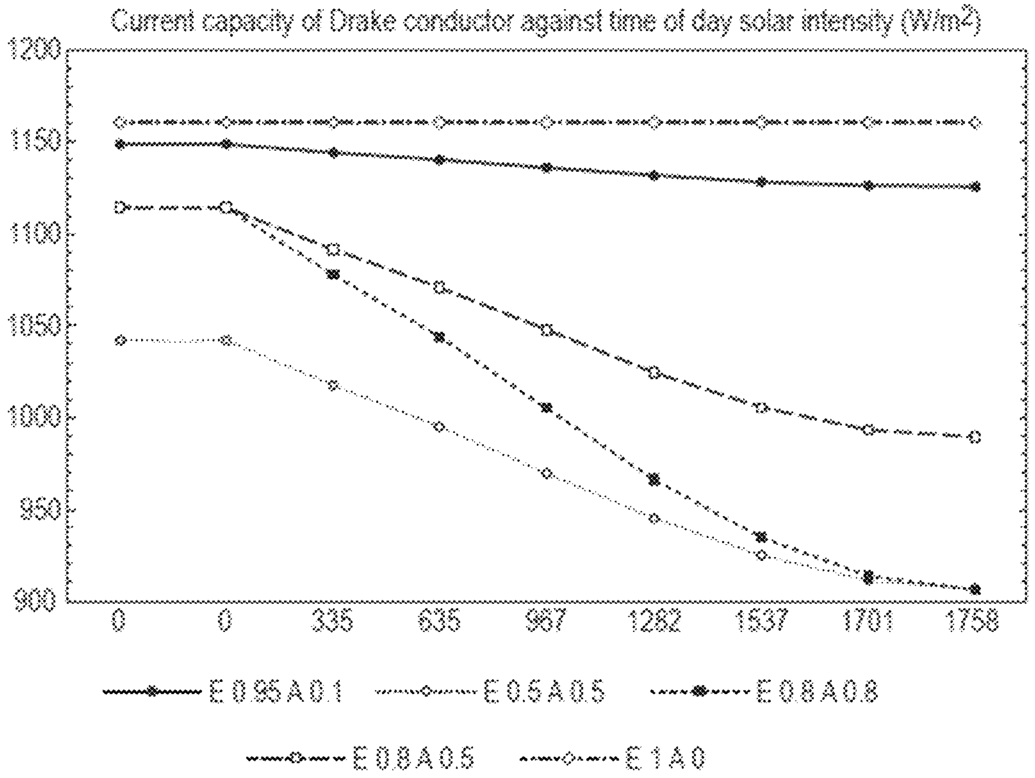
FIG. 5 shows how the ampacity of different types of conductors varies as a function of solar irradiance.
Figure 6:
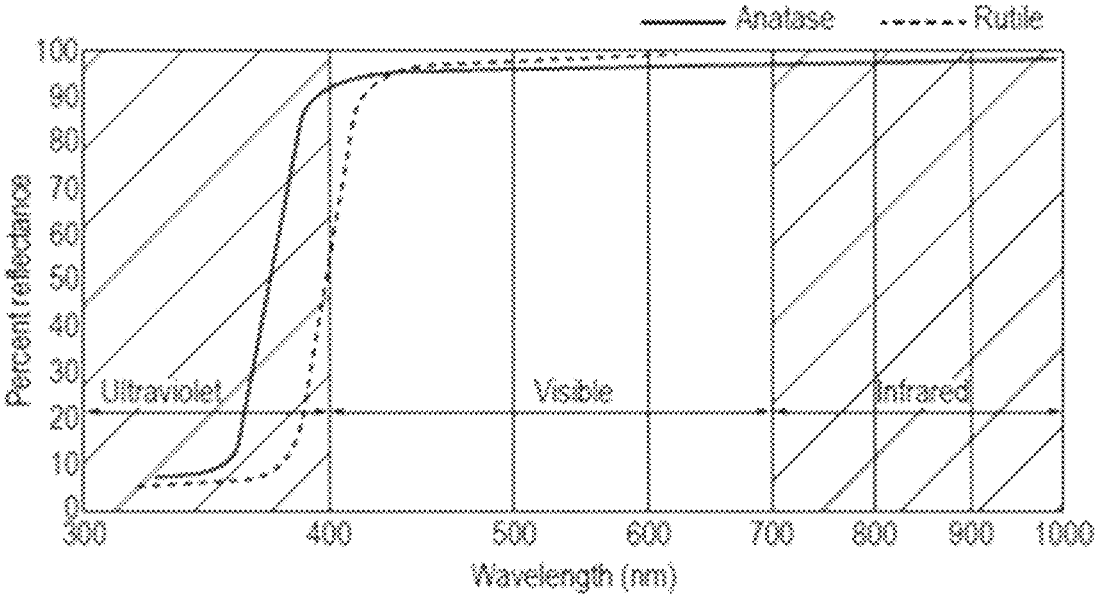
FIG. 6 shows the reflectance of anatase and rutile titanium dioxide ($TiO_2$) pigments as a function of wavelength.
Figure 7A:
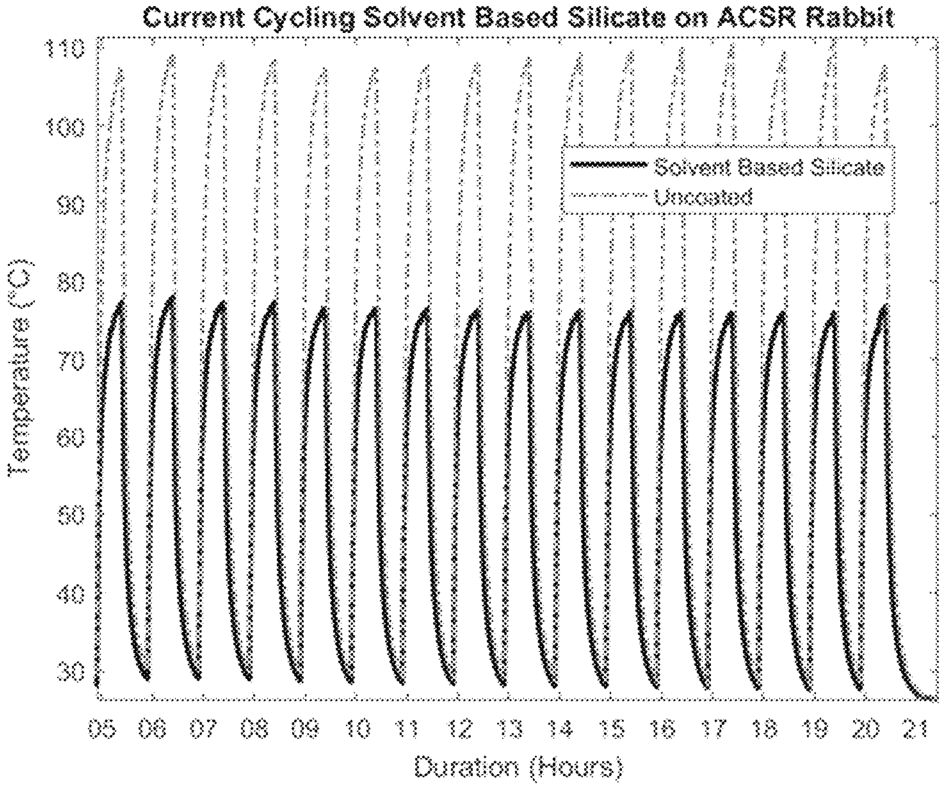
FIG. 7A shows current cycling in relation to an ACSR sample coated with a solvent based silicate and FIG. 7B shows current cycling in relation to an ACSR sample coated with a solvent based silicate.
Figure 7B:
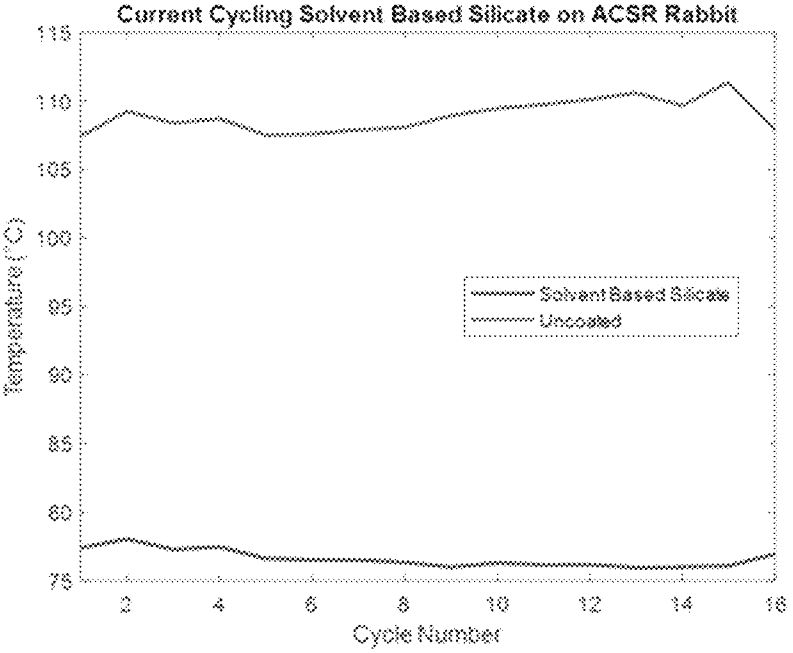
Figure 8:
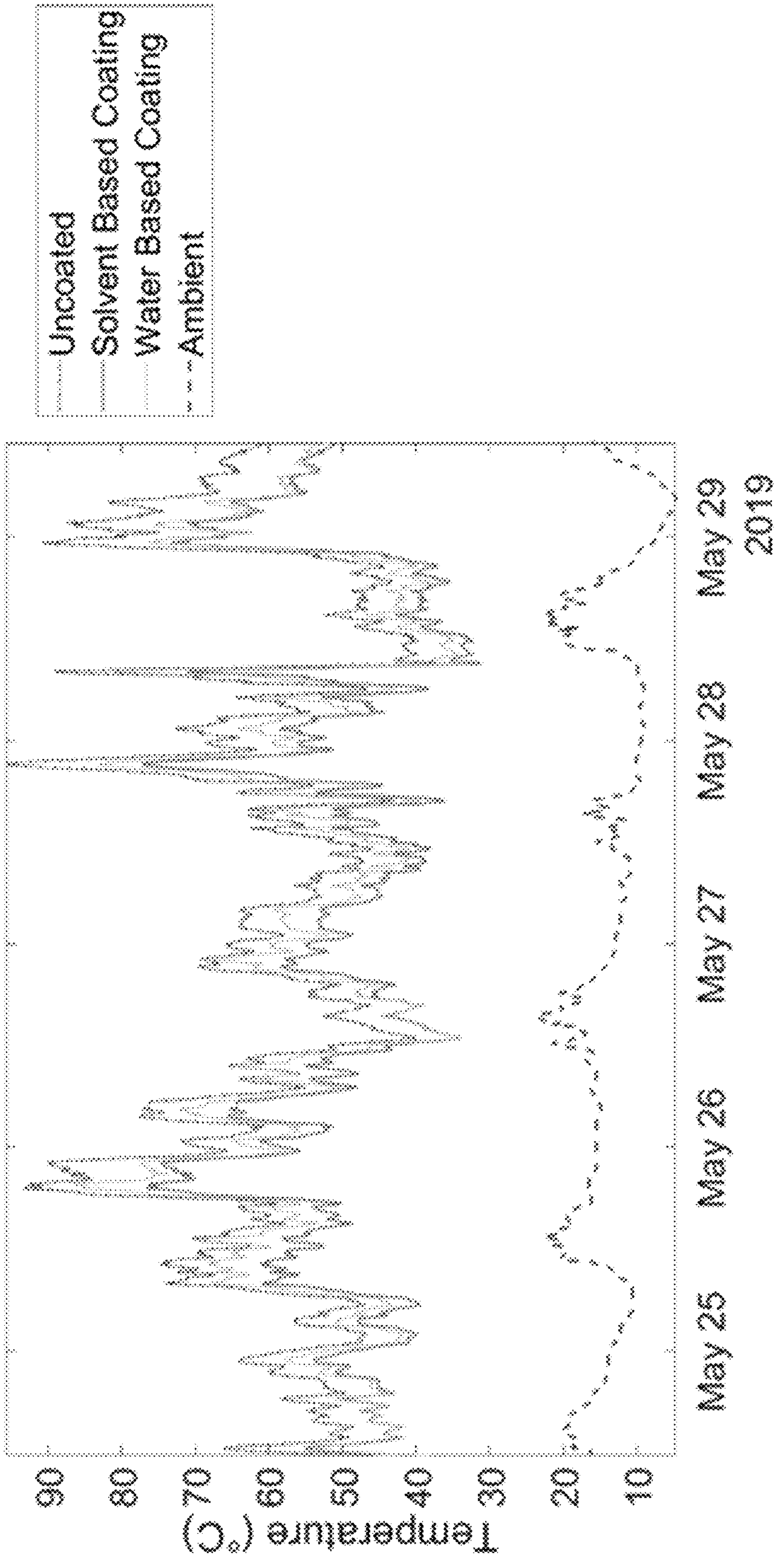
FIG. 8 demonstrates the outdoor cooling performance of both a water based and a solvent based silicate compared to an uncoated (control) sample.

FIG. 5 shows a plot of ampacity or current capacity against time of day solar intensity for a new, aged and dual coated conductor (included for illustrative purposes only) compared against a theoretical perfect conductor.

FIG. 5 shows that the ampacity of a modified conductor performs close to the performance of a theoretical perfect conductor (wherein the ampacity does not reduce with increasing solar irradiance). In particular, it is noted from FIG. 5 that the performance of a modified conductor shows a high level of performance after 8 hours in marked contrast to conventional conductors.

Technology Validation in a Laboratory Environment

Solar Reflective Layer

UV-VIS-NIR spectral analysis of a solar reflective layer was carried out by a third party using a JASCO (RTM) V670 UV-VIS-NIR spectrometer with ISN-723 integrating sphere attachment. An integrating sphere attachment allowed collection of diffuse radiation (about 180°) reflected by the sample. Analysis was undertaken in reflectance mode, with specular reflectance excluded. One spectrum was collected from each side of the sample. The sample was also turned 90° around the incident beam for analysis of the second side. This should have low absorbance in the solar spectrum (0.3-2.5 μm). The modified conductor demonstrates this.

Self-Cleaning Photonic Coatings to Increase the Capacity of Overhead Conductors

The present invention is particularly concerned with the inclusion of a photocatalytic agent in the coating 401 provided on an overhead conductor 400 in order to render the coating self-cleaning and a superhydrophobic agent to prevent salt laden moisture or dew forming upon the conductor 400. In particular, it should be understood that the coating is self-cleaning in the sense that when the photocatalytic agent is excited with ultra-violet ("UV") light then the photocatalytic agent preferably creates hydroxyl ($OH^-$) and superoxide ($O_2^-$) radicals which preferably decompose surface organic matter which may have accreted onto the overhead conductor into carbon dioxide ($CO_2$) and water ($H_2O$).

The coating 401 provided on the overhead conductor 400 according to the preferred embodiment is preferably white (or less preferably may be considered as having a high degree of whiteness). According to the preferred embodiment white may be defined as L*≥80.

Two particularly preferred embodiments will now be discussed in more detail below namely: (i) a single inorganic layer 401 formed from a two-part kit; and (ii) a single inorganic layer 401 formed from a one part kit.

Surface modification has emerged recently as a cost effective method to increase the performance of overhead conductors. These work by optimising the external surface of the overhead conductor in terms of its solar reflectivity and thermal emissivity. Having high values (e.g. ≥0.80, 0.85 or 0.90) for both solar reflectivity (R) and thermal emissivity (E) promotes a significant cooling effect on overhead conductors. This reduction in operating temperature reduces the resistance of the conductor and increases the current carrying capacity.

Several coating based solutions have been proposed to achieve this. For example, various inorganic and organic based coatings are known to lower the operating temperature of overhead lines.

However, the known coatings are predominantly non-white. Furthermore, a known problem with white conductors is that they suffer from discoloration over time and do not prevent moisture formation upon the coated conductor.

It will be appreciated by those skilled in the art that conventional single layer (or monolayer) white coating products will accrete dirt and invariably darken over time as they are exposed to environmental pollutants.

As such, there is a particular emphasis in conventional arrangements in promoting thermal emissivity which in turn increases the solar absorptivity. As overhead conductors may operate above 90° C., this approach does result in a net cooling effect. However, according to the preferred embodiment of the present invention the solar reflectivity (R) is also maximised which advantageously can increase the cooling power.

Thus, substantial performance benefits exist by providing both a highly reflective and a highly emissive coating for a conductor in a manner according to various embodiments of the present invention.

In contrast, conventional arrangements such as those disclosed, for example, in FR-2971617 (Nexan) and WO 2007/034248 (Simic) are considered to be ineffective from a commercial perspective due to the propensity for white coatings to darken and discolour over time.

The progressive darkening of initially white coatings over a period of time makes conventional white coatings preclusive as solutions for overhead conductors as network operators need to be able confidently to thermally rate their lines according to stable levels of solar reflectivity and thermal emissivity.

Thus, end users and network operators must plan according to an aged solar reflectance not the new or initial solar reflectance. It will be appreciated that significant and variable drops in solar reflectance are not practical from a network operators perspective who need to be able to thermally rate their overhead lines.

The surface of the conductor might also be washed with a high powered jet wash. However, a person skilled in the art will understand this to be impractical from a commercial, safety and cost perspective especially when considering that the distribution or power line will be a high voltage overhead line.

The provision of a coating having both a photocatalytic agent and a superhydrophobic agent according to the present invention which provides both a self-cleaning effect and an anti-corrosive effect will immediately be recognised as being advantageous.

A particular advantage of incorporating a self-cleaning photocatalyst into the coating according to the present invention is the ability to provide a durable white coating which requires little or no maintenance over time. According to various embodiments of the present invention the (white) coating will maintain a high degree of whiteness (i.e. L*≥80) for a substantially longer period of time than conventional white coatings. According to an embodiment the coating may remain white having a L*≥80 for an indefinite period of time when subjected to standard levels of airborne pollution.

According to various embodiments self-cleaning capabilities are preferably integrated into a white reflective monolayer.

Self-cleaning coatings may have a number of operating mechanisms. According to various embodiments the coating may be simultaneously: (i) anti-static thereby reducing the ability of particles to stick to the surface; and (ii) photocatalytic.

According to a particularly preferred embodiment anatase titanium dioxide ($TiO_2$) may be utilised as a photocatalytic agent. Anatase titanium dioxide ($TiO_2$) is a semi-conductor with a band gap of 3.2 eV, which when excited with UV/light, creates hydroxyl ($OH^-$) and superoxide ($O_2^-$) radicals which preferably act to decompose surface organic matter accreted onto the coating into carbon dioxide ($CO_2$) and water ($H_2O$).

Single Inorganic Layer Formed from a Two-Part Kit

A self-cleaning superhydrophobic white photonic coating according to an embodiment may be formed by mixing together two parts of a kit.

The two part composition may comprise a first composition (part A) comprising: (i) a coating binder 50-70 wt % (of part A); (ii) optionally one or more optically active pigments e.g. rutile titanium dioxide ($TiO_2$) 10-20 wt % (of part A); (iii) a photocatalytic agent e.g. anatase titanium dioxide ($TiO_2$) 1.76%-2.75 wt % (of part A); and (iv) a superhydrophobic agent.

The two part composition preferably comprises a second composition (part B) comprising: (i) either water of a non-aqueous solvent ≥50 wt % (of part B); and (ii) optionally a curing agent.

Siloxane (Silicone) Polymers

According to various arrangement a single coating may be formed which may at least partially comprise a siloxane (silicone) polymer.

For reference purposes the chemical structure of several different siloxanes is shown below:

Hexamethylcyclotrisiloxane (D3)

Chemical Formula: $C_6$—$H_{18}$—$O_3$—$Si_3$

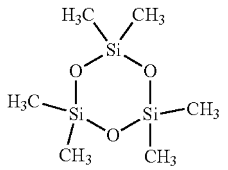

Structural Formula:

Molecular Weight: 222.46

CAS No.: 541-05-9

Synonyms: Dimethylsiloxane cyclic trimer

Octamethylcyclotetrasiloxane (D4)

Chemical Formula: $C_8$—$H_{24}$—$O_4$—$Si_4$

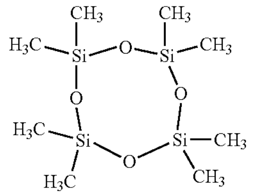

Structural Formula:

Molecular Weight: 296.64

CAS No.: 555-67-2

Synonyms: Cyclic dimethylsiloxane tetramer, KF994, Part of Cyclomethicone

Decamethylcyclopentasiloxane (D5)

Chemical Formula: $C_{10}$—$H_{30}$—$O_5$—$Si_5$

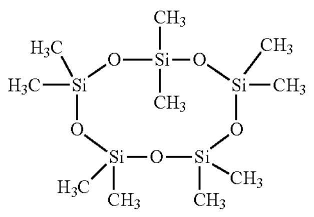

Structural Formula: 3 C

Molecular Weight: 307.80

CAS No. 541-02-6

Synonyms: Cyclic dimethylsiloxane pentamer, KF995, Dow coming 245 fluid, Part of Cyclomethicone Dodecamethylcyclohexasiloxane (D6)

Chemical Formula: $C_{12}$—$H_{36}$—$O_6$—$Si_6$

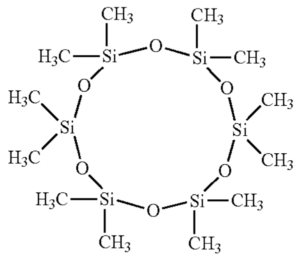

Structural Formula:

Molecular Weight: 444.93

CAS No.: 540-97-6

Synonyms: Cyclohexasiloxane

Hexamethyldisiloxane (HDMS)

Chemical Formula: $C_6$—$H_{18}$—O—$Si_2$

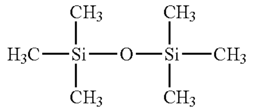

Structural Formula:

Molecular Weight: 162.42

CAS No.: 107-46-0

Synonyms: Oxybis(trimethylsilane), Bis(trimethylsilyl)ether

Polyorganosiloxane Resin

According to the present invention a composition is provided comprising a polyorganosiloxane binder.

Poly(diorganosiloxane)-based resins are raw materials in which a 3-dimensional polymer network consisting of primarily Si—O—Si linkages (where Si is silicon and O is oxygen) are dispersed in an appropriate solvent. The solvent may comprise water or organic solvents such as xylene, toluene and other non-polar solvents. The dispersed resins in the solvent preferably form an emulsion or solution. This backbone imparts a resulting coating with excellent thermal, UV and chemical resistance due to the strength of the Si—O bonds.

Within the polymeric structure itself, in addition to the Si—O—Si linkages which form the backbone, other functional groups are present to satisfy the required tetravalency of the silicon atoms. These may include organic aryl and alkyl groups, commonly denoted as 'R' in chemical nomenclature, or further inorganic elements such as zinc, well known to incorporate into the polymeric structure and impart excellent corrosion resistance.

Accordingly, for poly(diorganosiloxanes), the chemical formula of the polymer can be represented as $[R^1R^2SiO]_n$, where $R_1$ and $R_2$ are organic functional groups and may be the same or different.

This 2D chain is often used in conjunction with a cross-linking agent (see below) to increase the dimensionality of the binder:

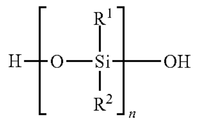

The above shows the structure of poly(diorganosiloxane) which may be utilised as a binder in accordance with the present invention, and wherein $R^1$ and $R^2$ are organic functional groups and may be the same or different.

The resin used in this formulation may include PDMS where the organic functional groups is a $C_1$ alkyl group.

According to various embodiments further alkyl groups may range from $R{=}C_1$ to $C_8$, i.e. octyl groups. Similarly, relevant is the use of alkenyl groups of chain length $C_2$ to $C_8$ and aryl groups of compositions $C_6$ (phenyl) to $C_{10}$. That is, each of $R^1$ and $R^2$ may be selected from $C_{1-8}$ alkyl, $C_{2-8}$ alkenyl and $C_{6-10}$ aryl.

In another embodiment, each of $R^1$ and $R^2$ may be independently selected from H or an organic group containing one or more the following functional groups: alkane, alkene, alcohol, aldehyde, ketone, carboxylic acid, aryl, ether, ester, amine, imine, or amide.

For example, each of $R^1$ and $R^2$ may be independently selected from H, alkyl (such as methyl, ethyl, propyl or butyl), —OH, alkoxy, an ester (such as acetoxy groups), alkenyl (such as $(CH_2)n\ CH{=}CH_2$, where n is any integer, for example 0, 1, 2 or 3), and aryl (such as phenyl).

Preferably, each of $R^1$ and $R^2$ is independently selected from H or a group comprising from 1 to 20, preferably 1 to 15, more preferably 1 to 10, non-hydrogen atoms. More preferably, each of $R^1$ and $R^2$ is independently selected from a group comprising from 1 to 20, preferably 1 to 15, more preferably 1 to 10, non-hydrogen atoms.

In one embodiment, the polyorganosiloxane binder is PDMS or a PDMS derivative.

In one embodiment, the polyorganosiloxane binder is non-fluorinated.

Commercially available poly(siloxane) resins suitable for use include, but are not limited to, SILRES BS 45 (RTM), SILRES BS 60 (RTM), SILRES MSE 100 (RTM), SILRES MPF 52 E (RTM), SILRES MP 50 E (RTM), SILRES BS 6042 (RTM) (all water-based), SILRES HP 2000 (RTM), SILRES HK 46 (RTM), SILRES REN 80 (RTM) (solvent-based) from Wacker (RTM), SVE-2067 (RTM) from ACC Silicones (RTM), the SILIKOPHEN (RTM) range from Evonik (RTM), DOWSIL 2405 (RTM), DOWSIL RSN-0431 HS (RTM), DOWSIL RSN-0808 (RTM) and DOWSIL US-CF-2403 (RTM) from Dow (RTM) and the Silmer (RTM) range from Siltech (RTM).

Adjunct Resin

An organic adjunct resin may optionally be included in the composition to improve the mechanical properties of the coating and its adhesion to metal. According to various embodiments an additional resin may be included to form a mixed binder system. The additional resin may comprise an organic resin which may comprise a water-borne acrylic emulsion of active content approximately 50%. Styrene resins may also be used although these are more prone to degradation under UV exposure due to the presence of aromatic moieties. Epoxy resins may also be used in conjunction with polysiloxanes. Co-polymeric resins can also be used, including styrene-acrylic co-polymers.

Acrylic resins are those in which the repeating unit of the polymer have acrylic acid- or ester-based side chains. Common acrylic resins include poly(methyl acrylate) ("PMA") and poly(methyl methacrylate) ("PMMA"). For styrene resins, the repeating unit consists of an aromatic functionality in the polymer side chain, for example in poly(styrene), where every other carbon in the backbone is bonded to a phenyl ring. For a copolymer of the two, the repeating units alternate, either in a random or a structured fashion dependent on the synthetic method used. Epoxy resins are ubiquitous in the coatings industry, and consist of repeating units with epoxide functionalities. Representative examples of the chemical structure of each are shown below:

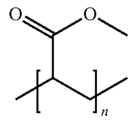

a

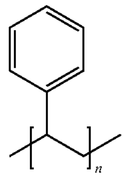

b

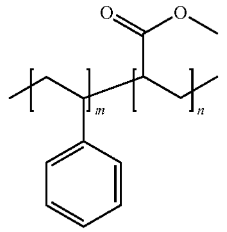

c

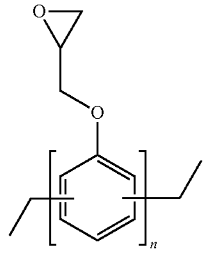

d

The above shows a representative structure of different adjunct resins according to various embodiments namely: (a) acrylic resins (poly(methyl acrylate)); (b) styrene resins (poly(styrene)); (c) styrene-acrylic co-polymers (using styrene and methyl acrylate); and (d) epoxy resins (standard epoxy phenol novolac).

Commercially available acrylic resins suitable for use include, but are not limited to, the ACRONAL (RTM) range from BASF (RTM), the PRIMAL (RTM) range from Dow (RTM) and certain resins from the Orgal (RTM) range from Organik Kimya (RTM). Commercially available epoxy resins suitable for use include, but are not limited to, ANCAREZ AR555 (RTM) from Evonik (RTM), the D.E.R (RTM) range from Olin Epoxy (RTM) and the EPON (RTM) range from Hexion (RTM). Commercially available styrene-acrylic copolymer resins suitable for use include, but are not limited to, the ACRONAL range (RTM) from BASF (RTM) and certain resins from the Orgal (RTM) range from Organik Kimya (RTM). The benefits of using a mixed binding system include increased resistance to weathering and corrosion resistance in comparison to organic-only resins, and the ability to cure at ambient temperature. Adhesion is also improved over siloxane-only coatings. Such coatings are also able to replace two-coat systems (i.e. primer, mid-coat, top-coat etc.) with a single layer coating. Commercially available mixed polysiloxane and organic resins suitable for use include, but are not limited to, SILRES HP (RTM) from Wacker (RTM) and SILIKOFTAL (RTM) and SILIKOPON (RTM) from Evonik (RTM). Organic resin-compatible polysiloxane binders resins suitable for use include, but is not limited to, SILRES SY 409 (RTM) from Wacker (RTM) and DOWSIL 5314 (RTM), DOWSIL SH 840 (RTM), DOWSIL 3037 (RTM), DOWSIL 3055 (RTM), DOWSIL 3074 (RTM) and DOWSIL RSN-0409 HS (RTM) from Dow (RTM).

Superhydrophobic Agent

A superhydrophobic agent is preferably included in the composition according to a preferred embodiment of the present invention. One additive which can be used to increase the superhydrophobicity of the coating is surface functionalised silica nanoparticles. Silica nanoparticles can be surface functionalised with silane coupling agents to impart superhydrophobicity. These can include hexamethyldisilazane ("HMDS"), tetraethyl orthosilicate ("TEOS"), tridecafluorooctyltriethoxysilane ("FAS") or any other appropriate silane. After the silica nanoparticle has been surface treated the materials can be dried to form a fumed silica powder which then can be incorporated into the formulation as a dry reagent. Commercially available fumed silicas include Aerosil R 972 Evonik (RTM) which is a fumed silica after having been treated with dimethyldischolrosilane ("DDS"). Another commercially available surface functionalised silica nanoparticles which may be used herein is Aerosil R 812, which is a fumed silica surface treated with HMDS.

Alternatively, the hydrophobicity agent or more preferably superhydrophobic agent may include functional polysiloxanes which impart a strong hydrophobic effect. The polysiloxane additives may be added at 1-5% of the total formulation and may be modified with amine groups or fluoro-containing groups. These systems can be water based or solvent free. Commercially available examples include Silsan 1300 (RTM), TEGO Phobe 1505 (RTM) and RUCO-SIL B-HS (RTM).

According to another embodiment a hydrophobising agent or superhydrophobic agent comprises micro powder polymethylsilsesquioxanes which can impart significant hydrophobicity into the coating finish.

Preferably, the superhydrophobic agent is surface functionalised silica nanoparticles.

Cross Linking Agent

A cross linking agent including alkoxy silanes may optionally also be included in the composition. The silanes may include tetraethyl orthosilicate, octadecyltrichlorosilane, methyltrimethoxysilane, vinyltriethoxysilane, ethyltrimethoxysilane, propyltrimethoxysilane, 3-(2-aminoethyl)-aminopropyltrimethoxysilane, aminopropyltriethoxysilane, phenyltrimethoxysilane or glycidoxypropyltrimethoxysilane.

The alkoxy silanes can increase the abrasion resistance of the coating and may act as an adhesion promoter. Further, the functional groups of the alkoxy silanes can impart further hydrophobicity to the film.

Optical Agent(s)

According to various embodiments the film or coating may also include one or more optical agents to maximise solar reflectivity. Filler pigments can also be integrated to improve the emissivity and abrasion resistance. The filler should not reduce the solar reflectance. Suitable optical agent(s) have been discussed in detail above.

UV Stabiliser

Optionally UV stabilisers can also be formulated into the product. These may include ultraviolet light absorbers 2-(2H-Benzotriazol-2-yl)-p-cresol or 2--(4,6-Bis-(2,4-dimethylphenyl)-1,3,5-triazin-2-yl)-5-(octyloxy)-phenol. Alternatively, hindered amine light stabilisers ("HALS") such as Bis(1-octyloxy-2,2,6,6-tetramethyl-4-piperidyl)sebacate or Bis(1,2,2,6,6-pentamethyl-4-piperidyl)sebacate may be included.

Rheology Agent

Optionally, viscosity modifiers/rheology agents may be included in the composition. The thickeners may be cellulosic and may comprise methyl cellulose, hydroxy ethyl cellulose ("HEC"), carboxy methyl cellulose ("CMC"), hydroxy propyl cellulose ("HPC") or hydrophobically modified HEC. Alternatively, alkali swellable emulsions ("ASE"), hydrophobic alkali swellable emulsions ("HASE"), hydrophobically modified ethylenoxide urethane rheology modifier ("HUER"), organoclays, polyamides and fumed silicas may be used.

Wetting Agents/Dispersion Agents

Optionally, a wetting agent and/or a dispersion agent such as DeCAL 2076 (RTM) may be included in the composition.

Primer

The underlying substrate for the coating is aluminium metal. Adhesion can be improved by using a primer such as ethyl silicate direct to metal primer.

Coating Process

The coating can be applied by spray coating, dip coating, powder coating, melt extrusion or by other techniques.

One or more layers of a polymeric coating can be applied to a conductor such as an overhead cable. The one or more polymeric coating layers can be applied in a variety of manners. For example, in certain embodiments, the coating layer can be applied by an extrusion method, such as a melt extrusion. In other certain embodiments, the polymeric coating layer can be applied by powder coating, film coating or film wrapping, or by tape wrapping. In a tape wrapping process, adhesive or sealant can be used to help mechanically and/or chemically bond the tape to the conductor.

A melt extrusion process to apply a polymeric coating can generally include the steps of: (a) melting a polymer without a solvent to give a melted polymer; and (b) extruding the melted polymer around the plurality of conductive wires to form the polymeric coating layer. In certain embodiments, the melt extrusion process can be essentially solvent free and can be operated continuously. Melting can also mean softening of polymers such as, for example, when the polymer is formed from amorphous polymers.

A powder coating process to apply a polymeric coating can generally include the steps of: (a) spraying a powdered polymer onto an exterior surface of the plurality of conductive wires to give a sprayed conductor; and (b) heating the sprayed conductor to melt, or soften, the powdered polymer around the plurality of conductive wires to form a layer. The powder coating process can be essentially solvent free and can be operated continuously.

A film coating processes to apply a polymeric coating can generally include the steps of: (a) wrapping an exterior surface of the plurality of conductive wires with a polymeric film to give a wrapped conductor; and (b) heating the wrapped conductor to a melting point temperature of the polymer to soften the polymer around the plurality of conductive wires and form a layer. A film coating process can be essentially solvent free and can be operated continuously.

As can be appreciated, the polymeric coating layer can be applied to a variety of cable shapes. Particularly, the polymeric coating layer is not restricted to certain perimeter shapes and can be applied to overhead conductors having, for example, non-round or non-smooth outer surfaces caused by gaps in the plurality of outer conductors. As can be further appreciated however, a perimeter shape can generally be circular.

In certain embodiments, a pre-treatment process can be used to prepare a surface of the cable for coating. Pre-treatment methods can include, but are not limited to, chemical treatment, pressurized air cleaning, hot water treatment, steam cleaning, brush cleaning, heat treatment, sand blasting, ultrasound, deglaring, solvent wipe, plasma treatment and the like. For example, in certain embodiments, a surface of an overhead conductor can be deglared by sand blasting. In certain heat treatment processes, an overhead conductor can be heated to temperatures between 23-250° C. to prepare the surface of the conductor for the polymeric coating. As can be appreciated however, the temperature can be selected depending on the polymeric coating in certain embodiments.

In certain embodiments, the coating processes can be solvent free or essentially solvent free. Solvent free, or essentially solvent free can meant that no more than about 1% of a solvent is used in any of the processes, relative to the total weight of the product.

Melt Extrusion Process

In certain embodiments, a melt extrusion process can be used to apply a polymeric coating layer. In certain embodiments, the process can be essentially solvent free. In general, a melt extrusion process can include the extrusion of a melted polymer onto a conductor to form a polymeric layer. The polymeric layer can, in certain embodiments, be applied around an outer circumference of a conductor formed from a plurality of conductive wires. Alternatively, in certain embodiments, a plurality of polymeric layers can be applied to each, or certain, individual conductive wires in a conductor. For example, in certain embodiments, only the outermost conductive wires can be individually coated with a polymeric layer.

An understanding of an example melt extrusion process can be appreciated by explanation of an exemplary melt extrusion application of a resin around a conductor. In such example embodiments, a resin can be melted at temperatures of between 50-270° C. to form a melted polymer. The melted polymer can then be extruded over a bare overhead conductor using, for example, a single screw extruder to form an extruded coating layer. The extruder can be set at a convenient temperature depending on the coating material.

As can be appreciated, in certain embodiments, the polymeric coating material can be cured by a dynamic inline or post-coating process. The curing can be performed via a suitable chemical, thermal, mechanical, irradiation, UV, or E-beam method. Specific examples of such curing methods can include, but are not limited to, peroxide curing, monosil process curing, moisture curing, mold or lead curing and e-beam curing. The gel content (the cross-linked portion of the polymer which is insoluble in solvent) can be between 1% and 95%. A coating layer of 0.2 mm to 10 mm can be extruded in a continuous process according to certain embodiments, 0.2 mm to 3 mm in certain embodiments, and 0.2 mm to 1 mm according to certain embodiments.

As can be appreciated, a conformal polymeric coating layer can be formed through a melt extrusion process. To ensure conformability of a coating layer with an outer contour of the conductive wires, and adherence to the outer surfaces of the inner conductive wires, a vacuum can be applied between the conductor and the coating layer during extrusion. Alternatively, or additionally, compressive pressure can be applied to the exterior of the coating layer during heating or curing. Exterior pressure can be applied through, for example, a circular air knife. The conformal coating can improve the integrity of the overhead conductor.

The conformal coating can ensure that air gaps, or unfilled spaces, between a polymeric coating layer and an outer contour of the plurality of conductive wires are reduced relative to conventionally coated conductors. The outer contour of the conductive wires can be defined by an outline, shape or general packing structure of the conductive wires.

Using a melt extrusion method, curing and/or drying time can be greatly reduced, or completely eliminated, compared to conventional dip or spray methods of coating. As can be appreciated, the reduction in curing and/or drying times can allow for a higher line speed compared to other dip or spray processes. Additionally, existing melt extrusion processes can be readily adopted with few, or no, modifications to accommodate varying product specifications, whereas the traditional dip or spray processes can require new process steps.

Powder Coating Process

In certain embodiments, a powder coating process can be used to apply the one or more layers of the polymeric coating.

In such embodiments, a powder formed from the polymer can be sprayed onto an exterior surface of a conductor or conductive wires. In certain embodiments, an electro-static spray gun can be used to spray charged polymer powders for improved application of the powder to the conductor. In certain embodiments, the conductive wires can be pre-heated. After the powder is applied to the conductor or conductive wires, the sprayed conductive wires can be heated to a melting, or softening, temperature of the polymeric coating material. Heating can be performed using standard methods, including, for example, the application of hot air from a circular air knife or a heating tube. As can be appreciated, when a circular air knife is used, the melted polymer can be smoothed out under the air pressure and can form a continuous layer around the conductive wires.

The powder coating method also can be used to apply polymeric coating layers to a variety of conductor accessories, overhead conductor electrical transmission and distribution related products, or to other parts that can benefit from a reduced operating temperature. For example, dead-ends/termination products, splices/joints products, suspension and support products, motion control/vibration products (also called dampers), guying products, wildlife protection and deterrent products, conductor and compression fitting repair parts, substation products, clamps and other transmission and distribution accessories can all be treated using a powder coating process. As can be appreciated, such products can be commercially obtained from manufacturers such as Preformed Line Products (PLP), Cleveland, Ohio and AFL, Duncan, S.C.

Similar to melt extrusion processes, a coating layer applied through a powder coating process can optionally be cured inline with the powder coating process or through a post-coating process. Curing can be performed through a chemical curing process, a thermal curing process, a mechanical curing process, an irradiation curing process, a UV curing process, or an E-beam curing process. In certain embodiments, peroxide curing, monosil process curing, moisture curing, and e-beam curing can be used.

Similar to the melt extrusion process, a powder coating process can also be solvent free, or essentially solvent free, and can be continuously run.

Likewise, a powder coating process can be used to manufacture a conformable coating. In such embodiments, compressive pressure can be applied from the exterior of the coating layer during heating or curing to ensure conformability of the coating layer with the outer contour of the conductive wires, and adherence to the outline of the inner conductive wires.

The powder coating method can be used to form polymeric coating layers having a thickness of 500 μm or less in certain embodiments, 200 μm or less in certain embodiments, and 100 μm or less in certain embodiments. As can be appreciated, a low polymeric coating layer thickness can be useful in the formation of light weight, or low cost, overhead conductors.

Film Coating

In certain embodiments, a film coating process can be used to apply one or more layers of a polymeric coating.

In certain film coating processes, a film formed of a polymeric coating material can be wrapped around an exterior surface of a conductor. The film-wrapped conductor can then be heated to a melting temperature of the polymeric coating material to form the polymeric coating layer. Heating can be performed using standard methods, including, for example, hot air applied by a circular air knife or a heating tube. When a circular air knife is used, the melted polymer can be smoothed out under the air pressure and can form a continuous layer around the conductive wires.

In certain embodiments, a vacuum can be applied between the conductor and the coating layer to ensure conformability of the coating layer with the outer contour of the conductive wires, and adherence to the outline of the inner conductive wires. Alternatively or additionally, compressive pressure can be applied from the exterior of the coating layer during heating or curing.

Similar to melt extrusion processes, the coating layer can optionally be cured inline or through a post-coating process. Curing can be performed through a chemical curing process, a thermal curing process, a mechanical curing process, an irradiation curing process, a UV curing process, or an E-beam curing process. In certain embodiments, peroxide curing, monosil process (similar to the melt extrusion process(or a powder coating process can also be solvent free or essentially solvent free and can be continuous.

In certain embodiments, adhesives can be included on an exterior surface of the plurality of conductive wires, and/or on the film to improve application. As can be appreciated, in certain embodiments, a tape can be used instead of a film.

The film coating process can be used to form polymeric coating layers having a thickness of 500 μm or less in certain embodiments, 200 μm or less in certain embodiments, and 100 μm or less in certain embodiments. As can be appreciated, a low thickness can be useful in the formation of light weight, or low cost, overhead conductors.

EXAMPLES

Materials

Bluesil TCS 7513 was obtained from Elkem. TEGO Dispers 628, Aeroxide P25 and Aersosil R812 were obtained from Evonik Industries. Arquad 2C-75 was obtained from Nouryon. Altris W400 and Blanc Fixe N were obtained from Venator. Mattex Pro was obtained from BASF. Silnos 290 was obtained from Coating Products OHZ E.K. Rucosil B-LS was obtained from Rudolf Group.

Example 1 (4-61)

Rutile titanium dioxide (13.3%), barium sulfate (1.2%), calcined kaolin (0.9%), anatase titanium dioxide (2.0%), hexamethyldisilazane-functionalised fumed silica (0.9%) and silica (4.9%) was added to a solution of dispersing agent (0.9%) and surfactant (0.2%) in xylene (36.5%) under stirring using a high-speed mixer until a homogenous dispersion was achieved. Bluesil TCS 7513 (parts A and B, 10:1 weight ratio) (39.4%) were added to the pigment slurry and mixed until homogenous.

Example 2 (4-78)

Rutile titanium dioxide (11.0%), barium sulfate (1.0%), calcined kaolin (0.7%), anatase titanium dioxide (1.6%), hexamethyldisilazane-functionalised fumed silica (1.9%) and silica (3.5%) was added to a solution of dispersing agent (0.8%) and surfactant (0.3%) in xylene (46.3%) under stirring using a high-speed mixer until a homogenous dispersion was achieved. Bluesil TCS 7513 (parts A and B, 10:1 weight ratio) (32.5%) were added to the pigment slurry and mixed until homogenous.

Example 3 (4-79)

Rutile titanium dioxide (9.6%), barium sulfate (0.9%), calcined kaolin (0.6%), anatase titanium dioxide (1.4%), hexamethyldisilazane-functionalised fumed, silica (2.4%) and silica (3.5%) was added to a solution of dispersing agent (0.7%) and surfactant (0.2%) in xylene (54.6%) under stirring using a high-speed mixer until a homogenous dispersion was achieved. Bluesil TCS 7513 (parts A and B, 10:1 weight ratio) (26.1%) were added to the pigment slurry and mixed until homogenous.

Example 4 (4-80)

Rutile titanium dioxide (8.0%), barium sulfate (0.7%), calcined kaolin (0.5%), anatase titanium dioxide (1.2%), hexamethyldisilazane-functionalised fumed silica (3.5%) and silica (2.9%) was added to a solution of dispersing agent (0.8%) and surfactant (0.1%) in xylene (58.6%) under stirring using a high-speed mixer until a homogenous dispersion was achieved. Bluesil TCS 7513 (parts A and B, 10:1 weight ratio) (23.7%) were added to the pigment slurry and mixed until homogenous.

Example 5 (4-87)

Rutile titanium dioxide (11.8%), barium sulfate (1.1%), calcined kaolin (0.7%), anatase titanium dioxide (1.7%), hexamethyldisilazane-functionalised fumed silica (0.8%) and silica (4.3%) was added to a solution of dispersing agent (0.8%) and surfactant (0.2%) in xylene (42.2%) under stirring using a high-speed mixer until a homogenous dispersion was achieved. Bluesil TCS 7513 (parts A and B, 10:1 weight ratio) (35.3%) and a polysiloxane-based hydrophobising agent (1.1%) were added to the pigment slurry and mixed until homogenous.

Example 6 (4-90)

Rutile titanium dioxide (14.2%), barium sulfate (1.3%), calcined kaolin (0.9%), hexamethyldisilazane-functionalised fumed silica (1.0%) and silica (5.2%) was added to a solution of dispersing agent (1.2%) and surfactant (0.2%) in xylene (33.9%) under stirring using a high-speed mixer until a homogenous dispersion was achieved. Bluesil TCS 7513 (parts A and B, 10:1 weight ratio) (42.2%) were added to the pigment slurry and mixed until homogenous.

Testing

Each of the compositions of Examples 1-4 and 6 were applied to an aluminium plate, dried at room temperature and then cured in an oven at 150° C. for 5-10 minutes.

The composition of Example 5 was applied to an aluminium plate, dried at room temperature and then cured in an oven at 150° C. for 6 hours.

Each of the coatings was then tested for adhesion, flexibility and environmental resistance (temperature, water and acid resistance) using the following tests:

Adhesion

Adhesion was determined using the Crosshatch Adhesion Tape Test (ASTM D3359-17). A crosshatch was scored into the coating using a crosshatch blade, over which scotch tape was applied and subsequently removed. The percentage of coating remaining in the scored area was evaluated and the adhesion level of the coating rated.

Flexibility

Flexibility of the coating was determined through simulation of the mandrel bend test, in which a coated aluminium plate was bent over a cylindrical mandrel and the coating subsequently visually inspected for any cracks, splitting or defects.

Temperature Resistance

After being drawn down on a sandblasted aluminium plate and cured under ambient conditions, the coating was placed in an oven at 150° C. for 3 days, after which it was removed and cooled to room temperature.

Water Resistance

After being drawn down on a sandblasted aluminium plate and cured under ambient conditions, the coating was immersed in a water bath at room temperature for 3 days.

After this time, the panel was removed and allowed to air-dry under ambient conditions.

Acid Resistance

After being drawn down on a sandblasted aluminium plate and cured under ambient conditions, the coating was immersed in a bath of ~3 mM $HCl_{(aq)}$(~pH 4) at room temperature for 3 days. After this time, the panel was removed and allowed to air-dry under ambient conditions.

For each of Examples 1-4 and 6 the coatings showed excellent adhesion to the substrate (5B by ASTM D3359-17). These coatings were also highly flexible, showing no cracking or splitting when subjected to the mandrel bend test. These coatings also showed no changes or detrimental effects upon water immersion, acid immersion and temperature stability tests.

For Example 5, the coating showed excellent adhesion to the substrate (5B by ASTM D3359-17). This coating was also highly flexible, showing no cracking or splitting when subjected to the mandrel bend test. The coating showed no visual changes or detrimental effects upon water immersion, acid immersion and temperature stability tests, although a slight loss of adhesion (to 4B by ASTM D3359-17) was observed for the water and acid treated panels.

The compositions of each of Examples 1-6 and the testing results are shown in Tables 5 and 6 below.

TABLE 5

| Raw Material (Trade) | Raw Material (Category) | Coating composition wt. % Example 1 | Example 2 | Example 3 |
|---|---|---|---|---|
| Xylene | Xylene (solvent) | 36.45 | 46.29 | 54.57 |
| Bluesil TCS 7513 | Polyorganosiloxane binder | 39.43 | 32.54 | 26.14 |
| TEGO Dispers 628 | Dispersant (solvent-based) | 0.92 | 0.75 | 0.68 |
| Arquad 2C-75 | Surfactant (quaternary ammonium salt) | 0.15 | 0.33 | 0.17 |
| Altris W400 | Rutile $TiO_2$ (reflective agent) | 13.28 | 10.95 | 9.64 |
| Blanc Fixe N | Barium sulphate | 1.17 | 0.99 | 0.85 |
| Mattex Pro | Calcined kaolin | 0.86 | 0.69 | 0.61 |
| Aeroxide P25 | Anatase $TiO_2$ (photocatalytic agent) | 1.95 | 1.57 | 1.41 |
| Aerosil R 812 | Fumed silica (superhydrophobic agent) | 0.93 | 1.87 | 2.42 |
| Silnos 290 | Silica | 4.87 | 4.02 | 3.49 |
| Rucosil B-LS | Polysiloxane Hydrophobic Additive (superhydrophobic agent) | — | — | — |

| Raw Material (Trade) | Raw Material (Category) | Coating composition wt. % Example 4 | Example 5 | Example 6 |
|---|---|---|---|---|
| Xylene | Xylene | 58.56 | 42.20 | 33.88 |
| Bluesil TCS 7513 | Polyorganosiloxane binder | 23.72 | 35.29 | 42.24 |
| TEGO Dispers 628 | Dispersant (solvent-based) | 0.83 | 0.76 | 1.16 |
| Arquad 2C-75 | Surfactant (quaternary ammonium salt) | 0.12 | 0.16 | 0.16 |
| Altris W400 | Rutile $TiO_2$ (reflective agent) | 7.99 | 11.84 | 14.20 |
| Blanc Fixe N | Barium sulphate | 0.72 | 1.05 | 1.26 |
| Mattex Pro | Calcined kaolin | 0.50 | 0.74 | 0.88 |
| Aeroxide P25 | Anatase $TiO_2$ (photocatalytic agent) | 1.16 | 1.71 | — |
| Aerosil R 812 | Fumed silica (superhydrophobic agent) | 3.47 | 0.82 | 1.04 |
| Silnos 290 | Silica | 2.92 | 4.31 | 5.18 |
| Rucosil B-LS | Polysiloxane Hydrophobic Additive (superhydrophobic agent) | — | 1.12 | — |

TABLE 6

| | Test | | | | | |
|---|---|---|---|---|---|---|
| | Adhesion | Hardness | Flexibility | Water Immersion | Acid Immersion | Temperature Stability |
| 1 | 5B | >8B | No change | No change | No change | No change |
| 2 | 5B | >8B | No change | No change | No change | No change |
| 3 | 5B | 8B | No change | No change | No change | No change |

TABLE 6-continued

| | Test | | | | | |
|---|---|---|---|---|---|---|
| | Adhesion | Hardness | Flexibility | Water Immersion | Acid Immersion | Temperature Stability |
| 4 | 5B | >8B | No change | No change | No change | No change |
| 5 | 5B | >8B | No change | No visual change; slight loss of adhesion (4B) | No visual change; slight loss of adhesion (4B) | No change |
| 6 | 5B | >8B | No change | No change | No change | No change |

Although the present invention has been described with reference to preferred embodiments, it will be understood by those skilled in the art that various changes in form and detail may be made without departing from the scope of the invention as set forth in the accompanying claims.

Preferred Embodiments

Some preferred embodiments of the invention are set out below:

Embodiment 1. A composition for coating an overhead conductor comprising:

a reflective agent;

a photocatalytic agent comprising ≥70 wt % anatase titanium dioxide ($TiO_2$) having an average particle size ("aps")≤100 nm;

a polyorganosiloxane binder; and a superhydrophobic agent comprising either: (i) surface functionalised silica nanoparticles; (ii) a functional polysiloxane; or (iii) polymethylsilsesquioxane.

Embodiment 2. A composition as claimed in embodiment 1, wherein the reflective agent comprises rutile titanium dioxide ($TiO_2$).

Embodiment 3. A composition as claimed in embodiment 2, wherein the rutile titanium dioxide ($TiO_2$) has an average particle size ("aps"): (i) ≥100 nm; (ii) 100-200 nm; (iii) 200-300 nm; (iv) 300-400 nm; (v) 400-500 nm; (vi) 500-600 nm; (vii) 600-700 nm; (viii) 700-800 nm; (ix) 800-900 nm; and (x) 900-1000 nm.

Embodiment 4. A composition as claimed in embodiment 2 or 3, wherein the rutile titanium dioxide ($TiO_2$) comprises substantially spherical particles.

Embodiment 5. A composition as claimed in embodiment 1, wherein the reflective agent comprises sodium aluminosilicate ($AlNa_{12}SiO_5$), zinc oxide ($ZnO$) or copper oxide ($CuO$).

Embodiment 6. A composition as claimed in embodiment 1, wherein the reflective agent comprises a white filler.

Embodiment 7. A composition as claimed in embodiment 6, wherein the white filler comprises: (i) magnesium oxide ($MgO$); (ii) calcium oxide ($CaO$); (iii) aluminium oxide ($Al_2O_3$); (iv) zinc oxide ($ZnO$); (v) calcium carbonate ($CaCO_3$); (vi) aluminium silicate ($Al_2SiO_5$); (vii) kaolin ($Al_2O_3 \cdot 2SiO_2$); (viii) titanium dioxide ($TiO_2$); or (viii) barium sulphate ($BaSO_4$).

Embodiment 7a. A composition as claimed in any preceding embodiment, wherein the reflective agent does not comprise anatase titanium dioxide.

Embodiment 8. A composition as claimed in any preceding embodiment, wherein the photocatalytic agent comprises ≥75%, ≥80%, ≥85%, ≥90%, ≥95% or ≥99% wt % anatase titanium dioxide ($TiO_2$).

Embodiment 9. A composition as claimed in any preceding embodiment, wherein the polyorganosiloxane binder has the structure:

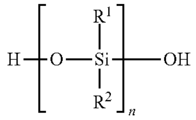

wherein $R^1$ and $R^2$ are organic functional groups and may be the same or different.

Embodiment 9a. A composition as claimed in Embodiment 9, wherein $R^1$ and $R^2$ are each independently H or an organic group containing one or more the following functional groups: alkane, alkene, alcohol, aldehyde, ketone, carboxylic acid, aryl, ether, ester, amine, imine, or amide.

Embodiment 9b. A composition as claimed in Embodiment 9a, wherein $R^1$ and $R^2$ are each independently H, alkyl (such as methyl, ethyl, propyl or butyl), —OH, alkoxy, an ester (such as acetoxy groups), alkenyl (such as $(CH_2)n$ $CH{=}CH_2$, where n is any integer, for example 0, 1, 2 or 3), and aryl (such as phenyl).

Embodiment 9c. A composition as claimed in any of Embodiments 9-9b, wherein $R^1$ and $R^2$ are each independently H or a group comprising from 1 to 20, preferably 1 to 15, more preferably 1 to 10, non-hydrogen atoms.

Embodiment 9d. A composition as claimed in Embodiment 9, wherein the polyorganosiloxane binder is PDMS or a PDMS derivative.

Embodiment 9e A composition as claimed in any preceding embodiment, wherein the polyorganosiloxane binder is non-fluorinated.

Embodiment 10. A composition as claimed in any preceding embodiment, wherein the surface functionalised silica nanoparticles are functionalized by either: (i) hexamethyldisilazane ("HMDS"); (ii) tetraethyl orthosilicate ("TEOS"); or (iii) tridecafluorooctyltriethoxysilane ("FAS").

Embodiment 10a. A composition as claimed in any preceding embodiment, wherein the superhydrophobic agent comprising (i) surface functionalised silica nanoparticles Embodiment 11. A composition as claimed in any preceding embodiment, wherein the functional polysiloxane is modified with one or more amine or fluoro-containing groups.

Embodiment 12. A composition as claimed in any preceding embodiment, wherein the composition when cured forms a coating having a water contact angle ("WCA") >1500.

Embodiment 13. A composition as claimed in any preceding embodiment, further comprising an organic adjunct resin.

Embodiment 14. A composition as claimed in embodiment 13, wherein the organic adjunct resin comprises either an acrylic resin, a styrene resin, an epoxy resin or a copolymeric resin.

Embodiment 15. A composition as claimed in any preceding embodiment, further comprising a cross linking agent.

Embodiment 16. A composition as claimed in embodiment 15, wherein the cross linking agent comprises an alkoxy silane.

Embodiment 17. A composition as claimed in embodiment 16, wherein the alkoxy silane comprises either tetraethyl orthosilicate, octadecyltrichlorosilane, methyltrimethoxysilane, vinyltriethoxysilane, ethyltrimethoxysilane, propyltrimethoxysilane, 3-(2-aminoethyl)-aminopropyltrimethoxysilane, aminopropyltriethoxysilane, phenyltrimethoxysilane or glycidoxypropyltrimethoxysilane.

Embodiment 18. A composition as claimed in any preceding embodiment, further comprising a UV stabiliser.

Embodiment 19. A composition as claimed in embodiment 18, wherein the UV stabiliser comprises a ultraviolet light absorber.

Embodiment 20. A composition as claimed in embodiment 19, wherein the ultraviolet light absorber comprises 2-(2H-benzotriazol-2-yl)-p-cresol or 2--(4,6-Bis-(2,4-dimethylphenyl)-1,3,5-triazin-2-yl)-5-(octyloxy)-phenol.

Embodiment 21. A composition as claimed in embodiment 18, wherein the UV stabiliser comprises a hindered amine light stabiliser ("HALS").

Embodiment 22. A composition as claimed in embodiment 21, wherein the hindered amine light stabiliser comprises bis(1-octyloxy-2,2,6,6-tetramethyl-4-piperidyl)sebacate or bis(1,2,2,6,6-pentamethyl-4-piperidyl)sebacate.

Embodiment 23. A composition as claimed in any preceding embodiment, further comprising an emissive agent.

Embodiment 24. A composition as claimed in embodiment 23, wherein the emissive agent comprises an inorganic filler.

Embodiment 25. A composition as claimed in embodiment 24, wherein the inorganic filler comprises either: (i) calcium carbonate ($CaCO_3$); (ii) calcined kaolin ($Al_2O_3 \cdot 2SiO_2$); or (iii) talc (hydrated magnesium silicate ($H_2Mg_3(SiO_3)_4$ or $Mg_3Si_4O_{10}(OH)_2$)).

Embodiment 26. A composition as claimed in any preceding embodiment, further comprising a curing agent.

Embodiment 27. A composition as claimed in any preceding embodiment, further comprising a viscosity modifier and/or rheology agent.

Embodiment 28. A composition as claimed in embodiment 27, wherein the viscosity modifier and/or rheology agent comprises methyl cellulose, hydroxy ethyl cellulose ("HEC"), carboxy methyl cellulose ("CMC"), hydroxy propyl cellulose ("HPC"), hydrophobically modified hydroxy ethyl cellulose, an alkali swellable emulsion ("ASE"), an hydrophobic alkali swellable emulsion ("HASE"), a hydrophobically modified ethylenoxide urethane rheology modifier ("HUER"), an organoclay, a polyamide or fumed silica.

Embodiment 29. A composition as claimed in any preceding embodiment, further comprising a wetting agent and/or dispersion agent.

Embodiment 30. A composition as claimed in any preceding embodiment, wherein the wetting agent and/or dispersion agent comprises a poly acrylic acid, a polyurethane, a polyacrylate, a phosphoric acid ester or a modified fatty acid.

Embodiment 31. A composition as claimed in embodiment 30, further comprising a primer.

Embodiment 32. A composition as claimed in embodiment 31, wherein the primer comprises an ethyl silicate.

Embodiment 32a. A composition as claimed in any preceding embodiment, wherein the composition comprises from about 5 to about 25 wt. % reflective agent.

Embodiment 32b. A composition as claimed in any preceding embodiment, wherein the composition comprises from about 6 to about 20 wt. % reflective agent.

Embodiment 32c. A composition as claimed in any preceding embodiment, wherein the composition comprises from about 7 to about 16 wt. % reflective agent.

Embodiment 32d. A composition as claimed in any preceding embodiment, wherein the composition comprises from about 0.1 to about 5 wt. % photocatalytic agent.

Embodiment 32e. A composition as claimed in any preceding embodiment, wherein the composition comprises from about 0.5 to about 4 wt. % photocatalytic agent.

Embodiment 32f. A composition as claimed in any preceding embodiment, wherein the composition comprises from about 1.0 to about 2.5 wt. % photocatalytic agent.

Embodiment 32g. A composition as claimed in any preceding embodiment, wherein the composition comprises from about 10 to about 60 wt. % polyorganosiloxane binder.

Embodiment 32h. A composition as claimed in any preceding embodiment, wherein the composition comprises from about 20 to about 50 wt. % polyorganosiloxane binder.

Embodiment 32i. A composition as claimed in any preceding embodiment, wherein the composition comprises from about 20 to about 45 wt. % polyorganosiloxane binder.

Embodiment 32j. A composition as claimed in any preceding embodiment, wherein the composition comprises from about 1 to about 15 wt. % superhydrophobic agent.

Embodiment 32k. A composition as claimed in any preceding embodiment, wherein the composition comprises from about 2 to about 10 wt. % superhydrophobic agent.

Embodiment 32l. A composition as claimed in any preceding embodiment, wherein the composition comprises from about 3 to about 7 wt. % superhydrophobic agent.

Embodiment 32m. A composition as claimed in any preceding embodiment, wherein the composition comprises
from about 5 to about 25 wt. % reflective agent,
from about 0.1 to about 5 wt.% photocatalytic agent,
from about 10 to about 60 wt. % polyorganosiloxane binder, and
from about 1 to about 15 wt. % superhydrophobic agent.

Embodiment 32n. A composition as claimed in any preceding embodiment, wherein the composition comprises
from about 7 to about 16 wt. % reflective agent,
from about 1.0 to about 2.5 wt. % photocatalytic agent,
from about 20 to about 45 wt. % polyorganosiloxane binder, and
from about 3 to about 7 wt. % superhydrophobic agent.

Embodiment 32o. A composition as claimed in any preceding embodiment, wherein the composition further comprises a solvent.

Embodiment 32p. A composition as claimed in embodiment 32o, wherein the solvent comprises water or a non-aqueous solvent.

Embodiment 32q. A composition as claimed in embodiment 32p, wherein the solvent comprises xylene, xylol or dimethylbenzene ((CH3)2C6H4), toluene ((CH3)C6H5), ethanol (C2H5OH), isopropanol (CH3CH(OH)CH3), 2-ethoxyethanol (C2H5OC2$H_4$OH) or 2-ethoxyethyl acetate (CH3C(O)OC2H4OC2H5), preferably xylene.

Embodiment 32r. A composition as claimed in any of embodiments 32o-32q, wherein the composition comprises from about 15 to 70 wt. % solvent.

Embodiment 32s. A composition as claimed in any of embodiments 32o-32q, wherein the composition comprises from about 20 to 65 wt. % solvent.

Embodiment 32t. A composition as claimed in any of embodiments 32o-32q, wherein the composition comprises from about 25 to 60 wt. % solvent.

Embodiment 32u. A composition as claimed in any of embodiments 32o-32t, wherein the composition comprises from about 30 to 60 wt. % solvent.

Embodiment 33. An overhead conductor at least partially coated with a composition as claimed in any preceding embodiment, wherein, in use, the composition is cured so as to form a coating or film on at least a portion of the overhead conductor.

Embodiment 34. An overhead conductor as claimed in embodiment 33, wherein the coating or film has an average thermal emissivity coefficient E≥0.80, 0.85 or 0.90 across the infrared spectrum 2.5-30.0 μm.

Embodiment 35. An overhead conductor as claimed in embodiment 33 or 34, wherein the coating or film has an average solar reflectivity coefficient R≥0.80, 0.85 or 0.90 across the solar spectrum 0.3-2.5 μm.

Embodiment 36. An overhead conductor as claimed in any of embodiments 33, 34 or 35, wherein the coating or film is substantially white in colour and has a L*≥80, L*≥85, L*≥90 or a L*≥95.

Embodiment 37. An overhead conductor as claimed in any of embodiments 33-36, wherein the coating or film has an average thermal emissivity coefficient E≥0.80, 0.85 or 0.90 across the infrared spectrum 2.5-30.0 μm when tested in accordance with ASTM E408 (2013) and/or an average solar reflectivity coefficient R≥0.80, 0.85 or 0.90 and/or an average solar absorptivity coefficient A≤0.20, 0.15 or 0.10 across the solar spectrum 0.3-2.5 μm when tested in accordance with ASTM E903 (2012).

Embodiment 38. An overhead conductor as claimed in any of embodiments 33-37, wherein the overhead conductor when tested in accordance with ANSI C119.4-2004 operates at a lower temperature than the temperature of the same overhead conductor without the coating or film.

Embodiment 39. An overhead conductor as claimed in any of embodiments 33-38, wherein the overhead conductor is arranged and adapted to transmit, in use, electrical power at a voltage ≥2 kV, 2-50 kV, 50-100 kV, 100-150 kV, 150-200 kV, 200-250 kV, 250-300 kV, 300-350 kV, 350-400 kV, 400-450 kV, 450-500 kV, 500-550 kV, 550-600 kV, 600-650 kV, 650-700 kV, 700-750 kV, 750-800 kV or ≥800 kV.

Embodiment 40. An overhead conductor as claimed in any of embodiments 33-39, wherein the overhead conductor is arranged and adapted to operate, in use, up to a maximum operating temperature of 80° C., 90° C., 100° C., 110° C., 120° C., 130° C., 140° C., 150° C., 160° C., 170° C., 180° C., 190° C., 200° C., 210° C., 220° C., 230° C., 240° C., 250° C., 260° C., 270° C., 280° C., 290° C., 300° C. or >300° C.

Embodiment 41. An overhead conductor as claimed in any of embodiments 33-40, wherein the overhead conductor is arranged and adapted to be suspended, in use, between overhead pylons.

Embodiment 42. An overhead conductor as claimed in any of embodiments 33-41, wherein the overhead conductor comprises one or more metallic conductors.

Embodiment 43. An overhead conductor as claimed in any of embodiments 33-42, wherein the overhead conductor comprises one or more metal cables.

Embodiment 44. An overhead conductor as claimed in embodiment 42 or 43, wherein the one or more metallic conductors and/or the one or more metal cables comprise aluminium or an aluminium alloy.

Embodiment 45. An overhead conductor as claimed in any of embodiments 33-44, wherein the overhead conductor comprises: (i) an All Aluminium Conductor ("AAC"); (ii) an All Aluminium Alloy Conductor ("AAAC"); (iii) an Aluminium Conductor Steel Reinforced ("ACSR") conductor; (iv) an Aluminium Conductor Aluminium Clad Steel Reinforced ("ACSR/AW") conductor; (v) an Areal Bundled Cable ("ABC"); (vi) a High Temperature Low Sag ("HTLS") conductor; (vii) an Aluminium Conductor Composite Core ("ACCC") conductor; (viii) an Aluminium Conductor Steel Supported ("ACSS/MA") conductor; (ix) an Aluminium Conductor Aluminium Clad Steel Supported ("ACSS/AW") conductor; (x) a Thermal Resistant Aluminium Alloy Conductor Steel Reinforced ("TACSR") conductor; (xi) a Thermal Resistant Aluminium Alloy Conductor Aluminium Clad Steel Reinforced ("TACSR/AW") conductor; or (xii) a Super Thermal Resistant Aluminium Alloy Conductor Aluminium Clad Invar Reinforced ("STACIR/AW") conductor.

Embodiment 46. An overhead conductor as claimed in any of embodiments 33-45, wherein the coating or film has a thickness in the range 1-10 μm, 10-20 μm, 20-30 μm, 30-40 μm, 40-50 μm, 50-60 μm, 60-70 μm, 70-80 μm, 80-90 μm, 90-100 μm, 100-110 μm, 110-120 μm, 120-130 μm, 130-140 μm, 140-150 μm, 150-160 μm, 160-170 μm, 170-180 μm, 180-190 μm, 190-200 μm, 200-300 μm, 300-400 μm, 400-500 μm, 500-600 μm, 600-700 μm, 700-800 μm, 800-900 μm, 900-1000 μm or >1 mm.

Embodiment 47. An electric power or distribution system comprising one or more overhead conductors as claimed in any of embodiments 33-46.

Embodiment 48. A method of coating or applying a film to an overhead conductor comprising:

applying a composition as claimed in any of embodiments 1-32 to at least a portion of an overhead conductor; and allowing the composition to cure.

Embodiment 49. A method as claimed in embodiment 48, wherein the step of allowing the composition to cure comprises allowing the composition to cure solely by moisture curing so as to form a coating or film on at least a portion of the overhead conductor.

Embodiment 50. A method as claimed in embodiment 49, wherein the step of allowing the composition to cure by moisture curing does not involve heating the composition above ambient temperature.

Embodiment 51. A method as claimed in embodiment 48, 49 or 50, further comprising allowing the composition to cure so as to form a coating or film on at least a portion of the overhead conductor without utilising a thermal curing step.

Embodiment 52. A method as claimed in any of embodiments 48-51, wherein the step of allowing the composition to cure so as to form a coating or film on at least a portion of the overhead conductor comprises maintaining the temperature of the composition and/the coating or film being formed on the overhead conductor below 100° C., 90° C. or 80° C.

Embodiment 53. A kit for forming a composition for coating an overhead conductor comprising:

a first part comprising: (i) a reflective agent; (ii) a photocatalytic agent comprising ≥70 wt % anatase titanium dioxide ($TiO_2$) having an average particle size ("aps") ≤100 nm; (iii) a polyorganosiloxane binder; and (iv) a superhydrophobic agent; and a second part comprising: (i) a solvent;

wherein, in use, the first and second parts are mixed together to form a composition which is applied to at least a portion of an overhead conductor in order to form a coating or film on at least a portion of the overhead conductor.

Embodiment 54. A kit as claimed in embodiment 53, wherein the solvent comprises either an aqueous solvent or a non-aqueous solvent.

Embodiment 55. A kit as claimed in embodiment 53 or 54, wherein the first part further comprises one or more of: (i) an emissive agent; (ii) a curing agent; (iii) a crosslinking agent; (iv) a flexibility agent; and (v) a rheology agent.

Embodiment 56. A kit as claimed in embodiment 53, 54 or 55, wherein the second part further comprises one or more of: (i) an emissive agent; (ii) a curing agent; (iii) a crosslinking agent; (iv) a flexibility agent; and (v) a rheology agent.

Embodiment 57. A kit as claimed in any of embodiments 53-56, further comprising a first device for spraying, painting or applying the composition on to at least a portion of one or more overhead conductors to form the coating or film.

Embodiment 58. A method of retro-fitting an overhead power transmission or distribution line comprising one or more overhead conductors, the method comprising: spraying, painting, coating or applying a composition on to at least a portion of an overhead conductor, wherein the composition comprises: (i) a reflective agent; (ii) a photocatalytic agent comprising ≥70 wt % anatase titanium dioxide ($TiO_2$) having an average particle size ("aps")≤100 nm; (iii) a polyorganosiloxane binder; (iv) a superhydrophobic agent; and (v) a solvent; and then allowing the composition to cure.

Embodiment 59. A method as claimed in embodiment 58, wherein the step of allowing the composition to cure comprises allowing the composition to cure solely by moisture curing so as to form a coating or film on at least a portion of the overhead conductor.

Embodiment 60. A composition for coating an overhead conductor comprising:

a reflective agent;

a polyorganosiloxane binder; and a superhydrophobic agent comprising either: (i) surface functionalised silica nanoparticles; (ii) a functional polysiloxane; or (iii) polymethylsilsesquioxane.

Embodiment 61. A composition as claimed in embodiment 60, further comprising a photocatalytic agent comprising ≥70 wt % anatase titanium dioxide ($TiO_2$) having an average particle size ("aps")≤100 nm.

The invention claimed is:

1. A composition for coating an overhead conductor comprising:

a reflective agent;

a polyorganosiloxane binder; and a superhydrophobic agent comprising either: (i) surface functionalised silica nanoparticles; (ii) a functional polysiloxane; or (iii) polymethylsilsesquioxane;

wherein the reflective agent comprises rutile titanium dioxide ($TiO_2$) having an average particle size ("aps") of ≥100 nm, sodium aluminosilicate ($AlNa_{12}SiO_5$), zinc oxide (ZnO) or copper oxide (CuO); or the composition further comprises an emissive agent which comprises: (i) calcium carbonate ($CaCO_3$); (ii) calcined kaolin ($Al_2O_3 \cdot 2SiO_2$); or (iii) talc (hydrated magnesium silicate ($H_2Mg_3(SiO_3)_4$ or $Mg_3Si_4O_{10}(OH)_2$)).

2. The composition of claim 1 further comprising a photocatalytic agent comprising ≥70 wt % anatase titanium dioxide ($TiO_2$) having an average particle size ("aps")≤100 nm.

3. The composition as claimed in claim 2, wherein the composition comprises from about 5 to about 25 wt. % reflective agent, from about 0.1 to about 5 wt. % photocatalytic agent, from about 10 to about 60 wt. % polyorganosiloxane binder, and from about 1 to about 15 wt. % superhydrophobic agent.

4. The composition as claimed in claim 1, wherein the composition further comprises a solvent, wherein said solvent comprises xylol or dimethylbenzene ($(CH_3)_2C_6H_4$), toluene ($(CH_3)C_6H_5$), ethanol ($C_2H_5OH$), isopropanol ($CH_3CH(OH)CH_3$), 2-ethoxyethanol ($C_2H_5OC_2H_4OH$) or 2-ethoxyethyl acetate ($CH_3C(O)OC_2H_4OC_2H_5$).

5. The composition as claimed in claim 4, wherein the composition comprises from about 15 to 70 wt. % solvent.

6. The composition as claimed in claim 1, wherein the reflective agent comprises a white filler, wherein the white filler comprises: (i) magnesium oxide (MgO); (ii) calcium oxide (CaO); (iii) aluminum oxide (Al2O3); (iv) calcium carbonate (CaCO3); (vi) kaolin (Al2O3·2SiO2); or (vii) barium sulphate (BaSO4).

7. The composition as claimed in claim 1, wherein the polyorganosiloxane binder is non-fluorinated.

8. The composition as claimed in claim 1, wherein the surface functionalised silica nanoparticles are functionalized by: (i) hexamethyldisilazane ("HMDS"); (ii) tetraethyl orthosilicate ("TEOS"); or (iii) tridecafluorooctyltriethoxysilane ("FAS").

9. The composition as claimed in claim 1, wherein the functional polysiloxane is modified with one or more amine or fluoro-containing groups.

10. The composition as claimed in claim 1, wherein the composition when cured forms a coating having a water contact angle ("WCA") >150°.

11. The composition as claimed in claim 1, further comprising a cross linking agent wherein the cross linking agent comprises an alkoxy silane, wherein the alkoxy silane comprises either tetraethyl orthosilicate, octadecyltrichlorosilane, methyltrimethoxysilane, vinyltriethoxysilane, ethyltrimethoxysilane, propyltrimethoxysilane, 3-(2-aminoethyl)-aminopropyltrimethoxysilane, aminopropyltriethoxysilane, phenyltrimethoxysilane or glycidoxypropyltrimethoxysilane.

12. The composition as claimed in claim 1, further comprising a UV stabiliser.

13. An overhead conductor at least partially coated with the composition as claimed in claim 1, wherein, in use, the composition is cured so as to form a coating or film on at least a portion of the overhead conductor.

14. The overhead conductor as claimed in claim 13, wherein the coating or film has an average thermal emissivity coefficient E≥0.80, 0.85 or 0.90 across the infrared spectrum 2.5-30.0 μm; and/or wherein the coating or film has an average solar reflectivity coefficient R≥0.80, 0.85 or 0.90 across the solar spectrum 0.3-2.5 μm; and/or wherein the coating or film is substantially white in colour and has a L*≥80, L*≥85, L*≥90 or a L*≥95.

15. A method comprising:

applying the composition as claimed in claim 1 to at least a portion of an overhead conductor; and allowing the composition to cure.

16. The method as claimed in claim 15, wherein the step of allowing the composition to cure comprises allowing the composition to cure solely by moisture curing so as to form a coating or film on at least a portion of the overhead conductor.

17. A kit for forming a composition for coating an overhead conductor comprising:

a first part comprising: (i) a reflective agent; (ii) a photocatalytic agent comprising ≥70 wt % anatase titanium dioxide ($TiO_2$) having an average particle size ("aps") ≤100 nm; (iii) a polyorganosiloxane binder; and (iv) a superhydrophobic agent; and a second part comprising: (i) a solvent;

wherein the reflective agent comprises rutile titanium dioxide ($TiO_2$) having an average particle size ("aps") of ≥100 nm, sodium aluminosilicate ($AlNa_{12}SiO_5$), zinc oxide (ZnO) or copper oxide (CuO); or the first part or the second part further comprises an emissive agent which comprises: (i) calcium carbonate ($CaCO_3$); (ii) calcined kaolin ($Al_2O_3 \cdot 2SiO_2$); or (iii) talc (hydrated magnesium silicate ($H_2Mg_3(SiO_3)_4$ or $Mg_3Si_4O_{10}(OH)_2$)

wherein, in use, the first and second parts are mixed together to form a composition which is applied to at least a portion of an overhead conductor in order to form a coating or film on at least a portion of the overhead conductor.

* * * * *